United States Patent
King et al.

(10) Patent No.: US 6,934,322 B2
(45) Date of Patent: *Aug. 23, 2005

(54) DATA MESSAGE BIT SYNCHRONIZATION AND LOCAL TIME CORRECTION METHODS AND ARCHITECTURES

(75) Inventors: Thomas Michael King, Tempe, AZ (US); George Jeffrey Geier, Scottsdale, AZ (US); Troy L. Strother, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 219 days.

This patent is subject to a terminal disclaimer.

(21) Appl. No.: 10/364,186

(22) Filed: Feb. 11, 2003

(65) Prior Publication Data

US 2003/0147457 A1 Aug. 7, 2003

Related U.S. Application Data

(63) Continuation of application No. 09/931,120, filed on Aug. 16, 2001, now Pat. No. 6,532,251.

(51) Int. Cl.[7] .............................. H04B 1/69; H04B 7/185
(52) U.S. Cl. .................................... 375/150; 342/357.01
(58) Field of Search ................................. 375/150, 142, 375/130, 143, 152, 147; 342/357.01, 357.12, 357.05

(56) References Cited

U.S. PATENT DOCUMENTS

| | | | | |
|---|---|---|---|---|
| 5,420,593 A | * | 5/1995 | Niles ........................... | 342/357 |
| 5,506,861 A | * | 4/1996 | Bottomley ................... | 370/441 |
| 5,663,734 A | * | 9/1997 | Krasner .................. | 342/357.12 |
| 5,893,044 A | * | 4/1999 | King et al. ................. | 701/214 |
| 5,982,324 A | * | 11/1999 | Watters et al. .......... | 342/357.06 |
| 6,532,251 B1 | * | 3/2003 | King et al. ................. | 375/142 |
| 6,775,319 B2 | * | 8/2004 | King et al. ................. | 375/150 |

* cited by examiner

*Primary Examiner*—Khai Tran
(74) *Attorney, Agent, or Firm*—Roland K. Bowler, II

(57) ABSTRACT

Methods and architectures for data message bit synchronization of a spread spectrum signal having a repeating sequence of pseudorandom code bits modulated with data message bits having a data bit time that is an integer number of a repeat time of the pseudorandom code bits. In one embodiment, an adjusted bit sync offset time is determined for each of a plurality of signals for which bit sync offset time is not known based on a corresponding clock error corrected propagation time for each signal, based on a known bit synch offset time and based on a clock error corrected propagation time of the signal for which bit synch offset time is known.

18 Claims, 18 Drawing Sheets

| MODE | NUMBER OF SATELLITES SEARCHED | NUMBER OF DOPPLER BINS | CODE PHASE SEARCH SPACE PER DOPPLER BIN |
|---|---|---|---|
| 1 | 2 | 1 | 2046 |
| 2 | 1 | 2 | 2046 |
| 3 | 2 | 4 | 511 |
| 4 | 2 | 8 | 255 |
| 5 | 1 | 32 | 127 |
| 6 | 16 | 1 | 255 |
| ... | ... | ... | ... |
| X | 1 SATELLITE<br>3 SATELLITES<br>7 SATELLITES | 5 DOPPLER BINS<br>3 DOPPLER BINS<br>4 DOPPLER BINS | 73 HALF-CHIPS<br>143 HALF-CHIPS<br>87 HALF-CHIPS |

FIG. 9B

EXAMPLE TRUTH TABLE LOGIC FOR BUILDING R1*R2 PRODUCT

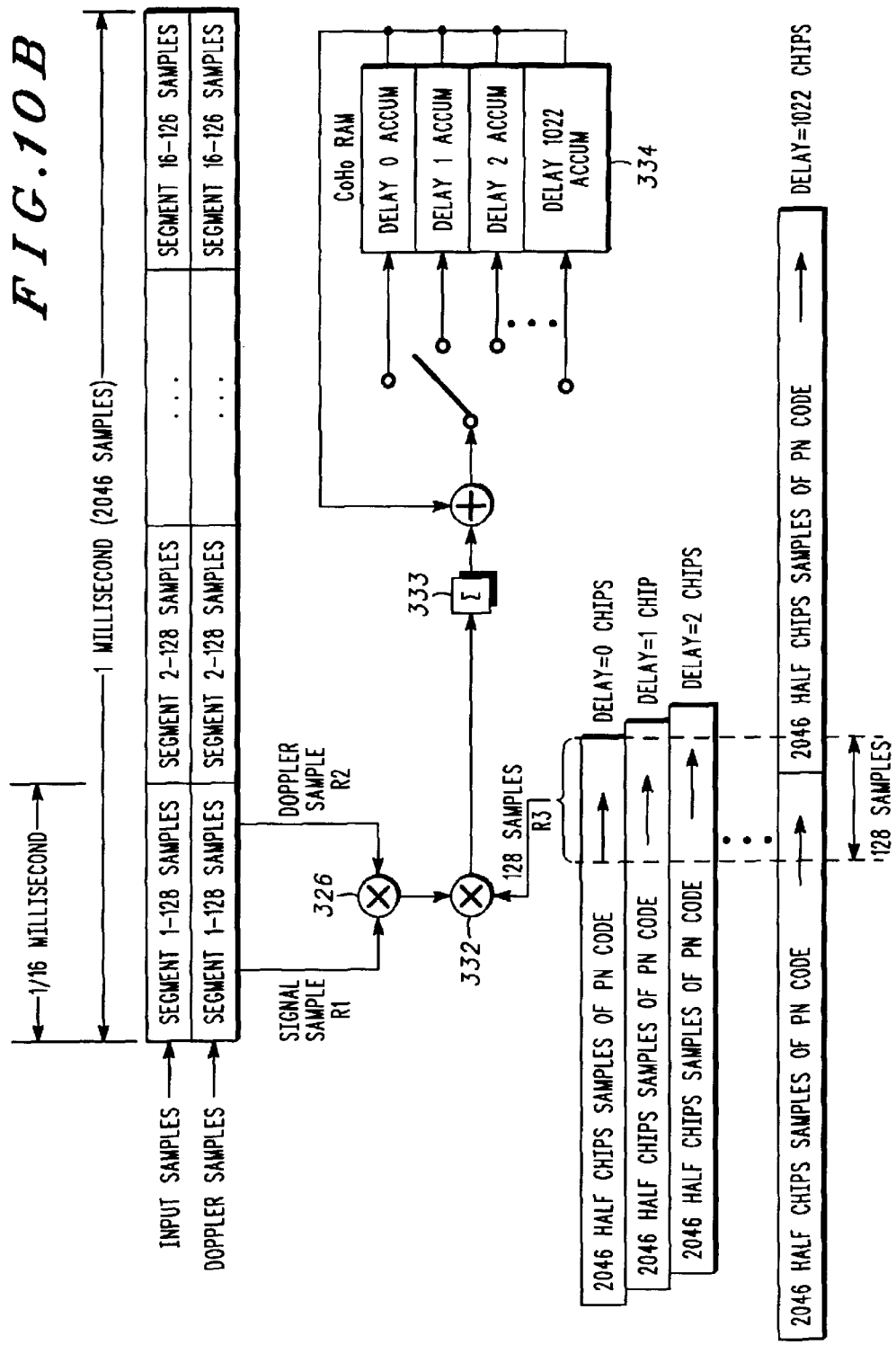

DATA MESSAGE BIT SYNCHRONIZATION AND LOCAL TIME CORRECTION METHODS AND ARCHITECTURES

CROSS REFERENCE TO RELATED APPLICATIONS

The present application is a continuation of U.S. application Ser. No. 09/931,120 filed on 16 Aug. 2001, now U.S. Pat. No. 6,532,251; from which benefits under 35 USC 120 are hereby claimed, and is related to co-pending U.S. application Ser. No. 09/931,121, filed on 16 Aug. 2001 entitled "Spread Spectrum Receiver Architectures And Methods Therefor", assigned commonly herewith and incorporated herein by reference.

FIELD OF THE DISCLOSURE

The present disclosure relates generally to spread spectrum receivers and methods, and more particularly to data message bit synchronization of spread spectrum signals having repeating sequences of pseudorandom code bits modulated with data message bits.

BACKGROUND OF THE DISCLOSURE

Satellite based positioning system enabled receivers, for example Global Positioning System (GPS) receivers, are used widely for navigation and have substantial potential to provide location information in mobile wireless communication devices, including cellular telephones, which must soon comply with United States Federal Communications Commission E-911 location requirements.

One of the foremost interesting specifications of a GPS receiver is the time required to acquire satellite signals, known as spread spectrum pseudorandom noise (PN) codes, and to provide position coordinates after power is applied to the receiver. The time required to perform these operations is known as the time-to-first-fix (TTFF), which is determined generally by the hardware and software architecture of the receiver.

In battery powered hand-held GPS receivers, including those embedded in cellular telephones, the acquisition time influences total battery life since the receiver is powered continuously during location determination. The time required to generate a location fix is also important in emergency location applications, for example in E-911 enabled cellular telephones. Another important consideration, particularly in hand-held GPS receivers, is the time to acquire signals in weak signal environments, for example in environments where the signal is obstructed by foliage, automobiles, urban canyons and buildings.

It is known to search the code phase space for a single satellite in parallel. U.S. Pat. No. 6,009,118 to Tiemann, for example, discloses 2046 parallel correlators that search all phase delays for a single satellite. In "Real Time Missile Tracking", Proceedings of the ION Aerospace Meeting", April 1981, Wells describes a flash parallel correlator that computes correlation parameters for as many as 64 different phase delays of a single satellite. In these and other known parallel correlation schemes, a correlator block is assigned to search for one satellite over a pre-determined number of phase delays. In both Tiemann and Wells, however, the correlator block searched only for one satellite at a time. In these and other prior art systems, satellite signal searching remains a sequential process, wherein the parallel processing applies only to the phase delays for the particular satellite being searched. In Tiemann and Wells, searching or detecting more than one satellite in parallel requires duplication of the parallel correlators.

Other examples of parallel correlators are described in U.S. Pat. No. 5,901,171 to Kohli, and U.S. Pat. No. 6,208,291 to Krasner. In these patents a parallel correlator circuit is duplicated N times in order to search for N satellites.

In some applications, the satellite signal receiver has knowledge of the visible satellites, their approximate Doppler frequency, and in some cases, the approximate phase delay and phase/polarity of the 50 bits per second (BPS) navigation message bits. This knowledge can come from locally stored ephemeris, almanac, approximate position, and time, or from other sources, for example, the IS-801 specification provides satellite visibility, Doppler, phase delay at a particular epoch time. Since there are generally 8–10 satellites visible at any one time, searching in parallel for these signals shortens the total acquisition time.

What is desired generally is an efficient spread spectrum signal searcher that substantially reduces the average TTFF in a manner that minimizes the number of gates/transistors and in some applications reduces power consumption.

The various aspects, features and advantages of the disclosure will become more fully apparent to those having ordinary skill in the art upon careful consideration of the following Detailed Description of the Invention with the accompanying drawings described below.

BRIEF DESCRIPTION OF THE DRAWINGS

FIG. 9b is an exemplary truth table logic.

FIG. 10b is another exemplary schematic processing flow diagram with one-chip delay correlation increments.

DETAILED DESCRIPTION OF THE DISCLOSURE

Figure 1:
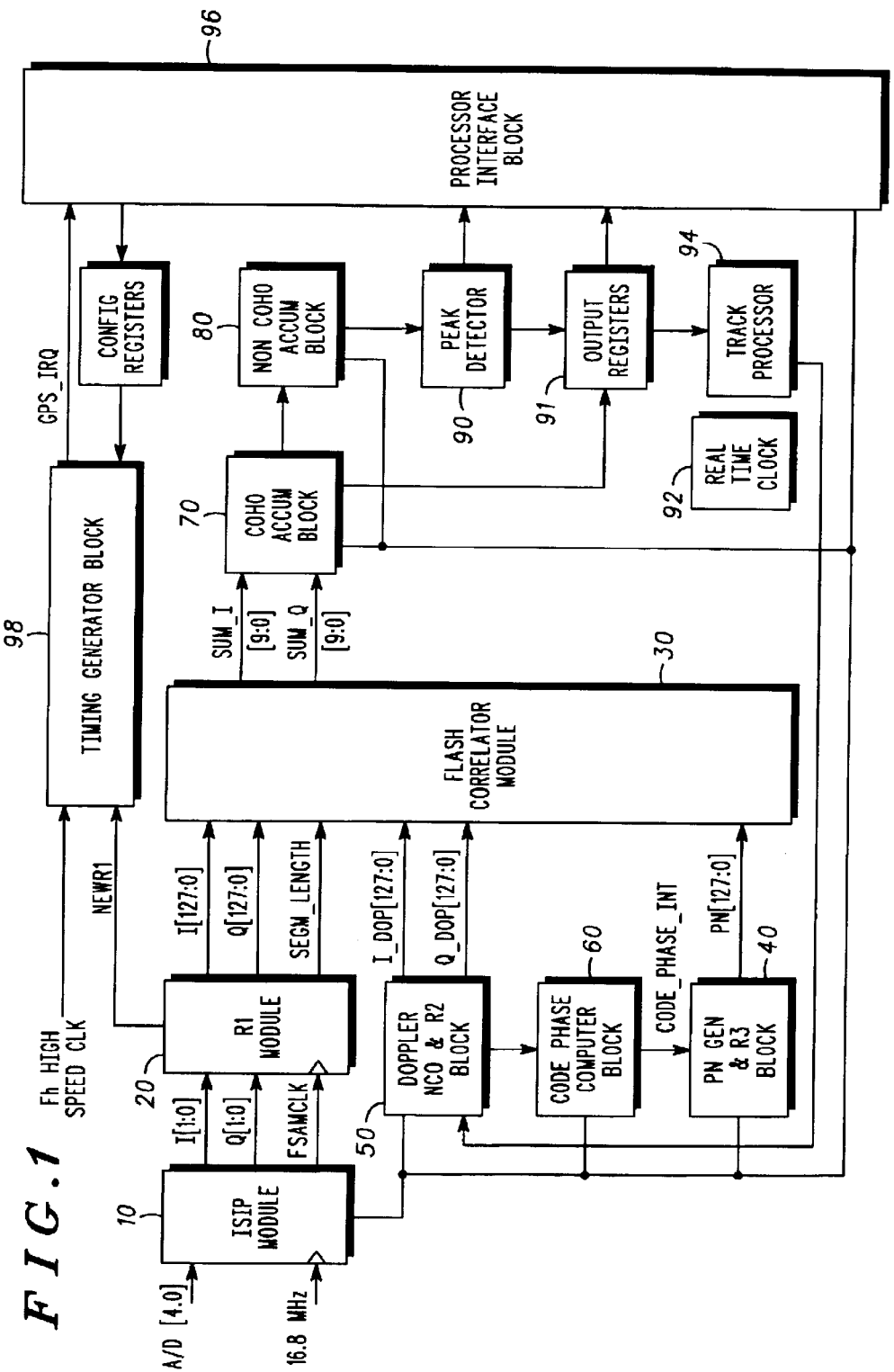
FIG. 1 is block diagram of an exemplary spread spectrum receiver.

FIG. 1 is a block diagram of an exemplary spread spectrum receiver comprising generally an input signal integration and preprocessing (ISIP) module 10, a segmentation and register block 20, a flash correlator block 30, a PN code generator block 40, a Doppler generator block 50, a code phase computer block 60, a coherent integration block 70, a non-coherent integration block 80, a peak detector block 90, a real time clock 92, and a track processing block 94, a processor interface block 96 and a timing generator block 98. In a preferred embodiment of the present invention, a single hardware correlator block is time shared to search for N satellites in parallel. In other embodiments, the correlator block may be duplicated to provide greater parallelization.

The receiver may be operated and controlled by either a resident digital signal processor (DSP) or by some other processor, not illustrated, for example a handset call processor in applications where the receiver is integrated in a cellular handset. In one embodiment, the receiver is controlled as an on-chip peripheral via an address-mapped parallel bus.

In its primary search for signals mode, in one embodiment, the receiver interrupts the controlling processor at a rate not exceeding 10 Hz. In a tracking mode, for example in GPS location applications, the receiver is programmable to interrupt at rates between 0 and 4095 in 1 ms steps, thus allowing processor software to control the code and frequency tracking loops. Alternatively, the receiver includes dedicated hardware for controlling the code and frequency tracking loops.

Figures 2, 3:
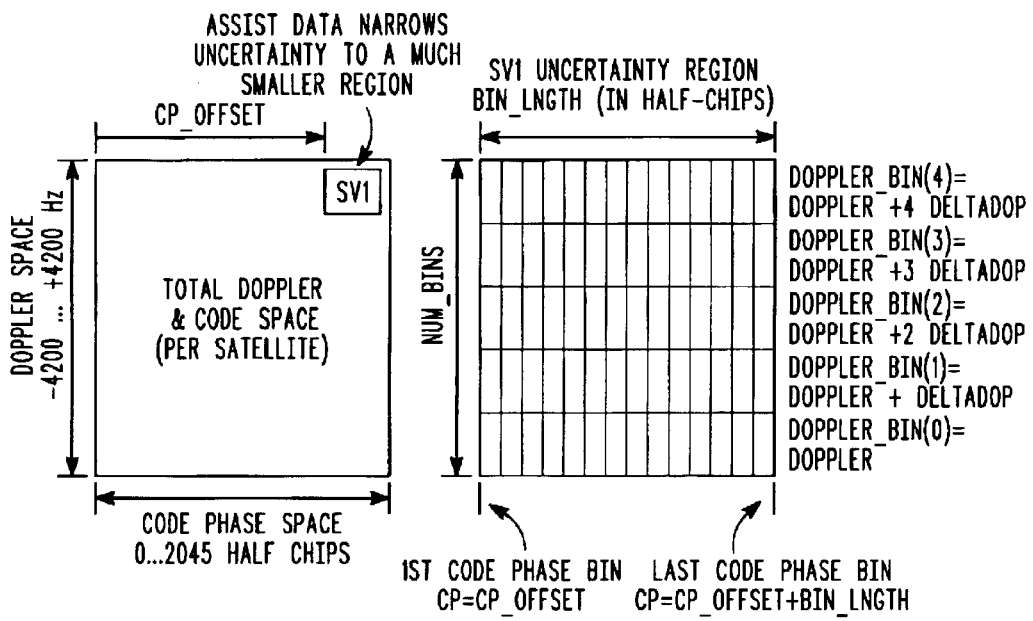
FIG. 2 illustrates GPS signal search space code phase and Doppler dimensions and a region thereof.
FIG. 3 illustrates several exemplary search modes.

To perform a sky search for a particular GPS satellite, all possible phase delays and all possible Doppler shifts must generally be searched. FIG. 2 illustrates a two-dimensional total uncertainty space for a single GPS satellite SV1 and a smaller uncertainty region thereof determined, for example, with assistance data, e.g., satellite almanac, ephemeris, approximate position, and approximate time. The uncertainty space and region thereof both comprise a pseudorandom noise code phase dimension (Code Phase Space) and a Doppler frequency dimension (Doppler Space). Since the Code Phase Space can be described as 1023 possible PN code chips (N=2046 search bins for half-chip spacing search tests) and the Doppler space can be described as +/−5,000 Hz of Doppler uncertainty (M=10) search bins of Doppler at a pre-detection-integration (PDI) of 1 millisecond, the total number of search bins is given by N×M=20,460 search bins. In one embodiment of the present invention, all of these bins can be searched with a single correlator, wherein each search bin is searched sequentially, one at a time. The term PDI is also referred to as the coherent integration time of the integration, the terms are used interchangeably.

At 1 millisecond per dwell, using a single correlator, 20.46 seconds are required to search all possible bins for a single satellite. The search time increases very quickly as the PDI is increased because the dwell time lengthens and the number of frequency bins increases. More generally, there is also uncertainty in local time and in the receiver reference oscillator with the result that the number of search bins may be substantially greater.

In FIG. 2, the uncertainty space may be narrowed substantially to a smaller uncertainty region with assistance data. See U.S. Pat. No. 6,121,923 entitled "Fixed Site And Satellite Data-Aided GPS Signal Acquisition Method And System", which is assigned commonly with the present application. In one mode of GPS operation, for example, the receiver uses traditional aiding information, including almanac, ephemeris, approximate position data, etc. In wireless communications applications, the receiver may use aiding data prescribed in a wireless assisted over the air standards specification, for example SVID, Doppler, code phase estimates, etc. The receiver also operates autonomously, without assistance data. In FIG. 2, the code phase dimension of the smaller uncertainty region includes N search space bins separated from an adjacent code phase bin by a BIN_LENGTH quantity, and the Doppler frequency dimension includes M search space bins separated from an adjacent bin by a deltaDop quantity.

The receiver is programmable to search code phase and Doppler space for one or more satellites in parallel, and more particularly the receiver is configurable dynamically and optimally to search any number of satellites over any number of code phase and Doppler bins.

The receiver employs pseudo or virtual parallelization through a batch parallel/serial architecture running faster than real time to search a specified uncertainty space or narrower region thereof including one or more phase delays and one or more Doppler frequencies. The exemplary searcher has the capability to search 4096 code phase-frequency-satellite search bins in real-time, using a 128 state flash parallel correlator that is time-multiplexed to cover the total uncertainty space or a lesser region thereof. In one embodiment, for example, one or more of the plurality of spread spectrum signals is correlated virtually in parallel over a corresponding predetermined Doppler search range having at least one Doppler search bin for a predetermined number of phase delays by sequentially correlating at a rate greater than a rate at which the spread spectrum signal is received. In another embodiment, a plurality of spread spectrum signals are correlated virtually in parallel over a predetermined number of phase delays by sequentially correlating the plurality of spread spectrum signals with corresponding replica signals at a rate greater than a rate at which the spread spectrum signals are received.

In GPS applications, the 1-millisecond PN code length consisting of 2046 half-chip delays, are segmented into 16 segments having unequal segment lengths by the receiver. The first 15 segments are 128 samples long, and the last segment is 126 samples long. Other unequal segmentations may be used also, although preferably each segment has a sufficient number of samples to permit the desired number of search bins to be tested during the period of time it takes to collect the next segment.

FIG. 3 illustrates several exemplary search modes of the spread spectrum signal receiver architecture. In a first mode, 2 satellites are searched simultaneously over the entire code phase uncertainty space (2046 half chip test bins) each at one Doppler bin or frequency. In a second mode, 1 satellite is searched simultaneously over the entire code phase uncertainty space at 2 Doppler frequencies. In a third mode, 2 satellites are searched simultaneously over a portion of the code phase uncertainty space (512 half chip test bins) each at 4 Doppler frequencies. In a fourth mode, 2 satellites are searched simultaneously over a portion of the code phase uncertainty space (256 half chip test bins) each at 8 Doppler frequencies. In a fifth mode, 1 satellite is searched simultaneously over 128 half-chips of code phase uncertainty space (2046 half chip test bins) at 32 Doppler frequencies. Other exemplary modes are also illustrated. The last mode X of FIG. 3 shows more clearly the degree of search mode flexibility. A total of 11 satellites are searched simultaneously and in parallel, each over different numbers of Doppler bins and each over a different number of half-chip delays, which are non-powers of two. The search modes of FIG. 3 are exemplary only and are not intended to limit the invention. The exemplary receiver can search and locate up to twelve satellite signals in parallel, each satellite searched over multiple Doppler bins and over an integer number of half-chips of code space uncertainty. The search over code phase and Doppler space for each satellite is controlled independently. The only restriction is that the number of total search bins cannot exceed the capacity of the searcher (4096 for the exemplary embodiment). Also, the receiver may search less than 4096 bins, in which case the correlator clock rate may be reduced.

In one mode of GPS operation, a Doppler search range is assigned to each of a plurality of the spread spectrum signals received, and one or more Doppler search signals are generated for each of the assigned Doppler search ranges. Where the Doppler search range includes more than one Doppler signal, there is a Doppler step size increment between each of the Doppler search signals within a particular Doppler search range. In one embodiment, the Doppler search signals generated for at least two of the plurality of Doppler search ranges is different, and the number of Doppler search signals generated is limited to some predetermined number.

The receiver may also operate in a tracking mode (once Doppler and code phase have been found for each visible satellite), in which code and carrier tracking loops are enabled in order to continuously update the pseudorange and pseudorange rate measurements for continuous position updates. In the tracking mode, the clock rate for most of the correlator array can be tuned down to a lesser frequency, about 5 MHz in the exemplary embodiment, since only a minimum number of code-Doppler bins are searched to maintain track.

The search space may also be compressed into 1-chip samples, allowing for a doubling of the code phase search space. Each satellite that is searched has a software selectable option that allows for 1 chip or ½ chip spacing. In the limit, for the exemplary embodiment, this option allows for full code-phase searching up to FOUR satellites simultaneously.

Figure 4:
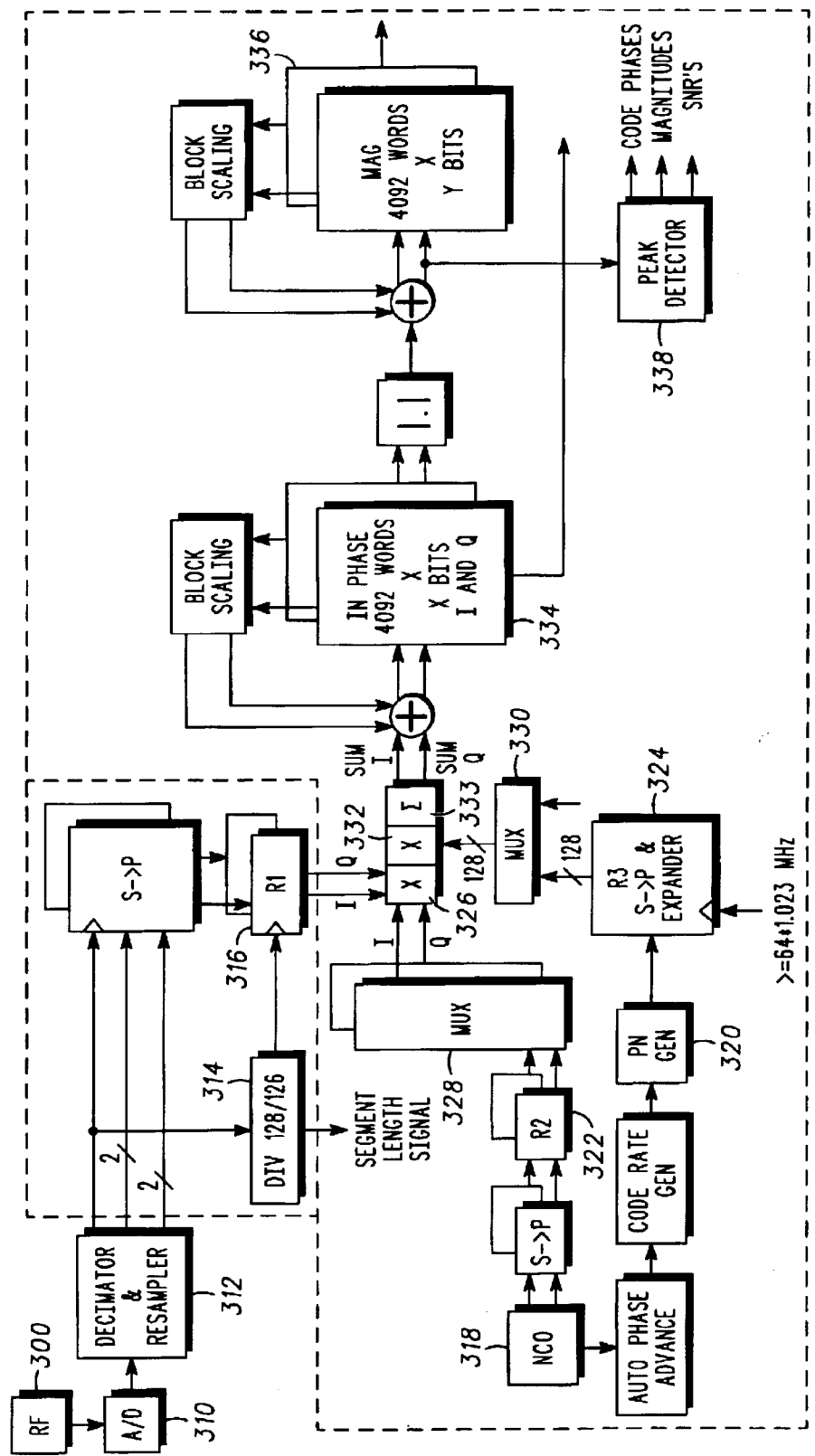
FIG. 4 is a functional block diagram of an exemplary receiver.

In FIG. 4, the function of the ISIP block of FIG. 1, includes an RF processing block 300, A/D conversion 310, and translation and scaling of sampled signal data from A/D converter into two-bit I & Q data samples at an effective rate, for example 1.023, 2.046, 4.092 or 8.184 MHz, depending on a sample rate parameter programmed into the controlling processor. In some embodiments a decimator & resampler 312 may be employed to translate samples to the desired sample rate.

The two-bit I & Q data samples are scaled into a sign-magnitude format (not two's complement) and each encodes four possible states of signal amplitude into the four possible states of the two bits. For example, state "00" represents a signal magnitude of +1, state "01" represents a signal magnitude of +3, state 10 represents a signal magnitude of −1, and state 11 represents a signal magnitude of −3. Any other ordering of state to signal magnitude is possible, which would deviate from a strict sign-magnitude format, as long as the flash correlator accommodates the format and uses the mapped signal magnitudes to form the correlation products.

In FIG. 4, sampled I & Q signal components are segmented into signal segments by a divider block 314. The signal segments are then stored into corresponding I & Q R1 registers 316 (only one of which is identified with a reference numeral). In the exemplary embodiment, the divider block (Div128/126) 314 unequally divides a 1 ms long segment of a 2046 half chip PN code bits into fifteen signal segments of 128 samples long and into one signal segment 126 samples long, and then repeats. Preferably, a last signal sample of the one signal segment is separated from a first signal sample of an adjacent signal segment by a single sample. Each completed segment is clocked into the R1 register 316 at a rate of approximately 16 KHz, or sixteen times for each PN code repeat cycle. The divider block Div128/126 also outputs a segment length signal, for example a 1 or 0, to subsequent processing elements to indicate whether to process 128 samples or 126 samples of the R1 register.

Figure 5:
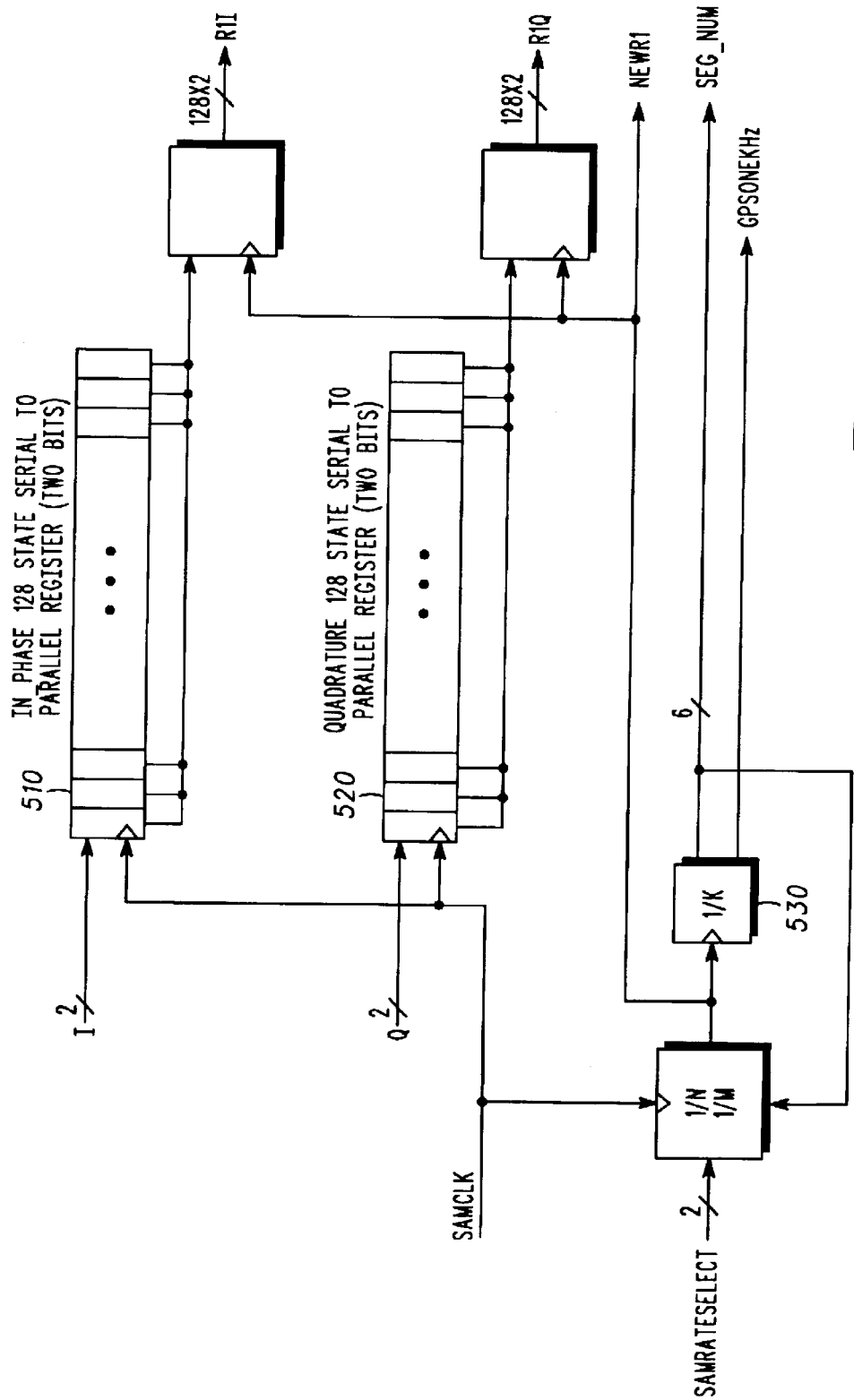
FIG. 5 is a block diagram of I & Q signal segment registers.

FIG. 5 is a more detailed illustration of the I & Q R1 registers 316 of FIG. 4, which store the two-bit I & Q signal segments. Particularly, the register block comprises I & Q serial to parallel registers 510 and 520, and a GPSOneKHz clock generator 530. In the exemplary embodiment, the unequal segments are clocked into the I & Q registers 510 and 520 sequentially at a rate of approximately 16 KHz. A signal (NewR1) is generated to indicate completion of a NewR1 data, a signal (Seg_Num) is generated to indicate the segment number of the NewR1, GPSOneKHz clock, and segmented samples of I & Q. Other embodiments may include parallel arrays of I & Q registers.

In the exemplary architecture, the clock signals generating I & Q signal segments and the clock loading the R1 registers are the only clocks in the receiver that require receiver quality stability, i.e., low phase noise clocks having an Allen variance not greater than $3*10^{-9}$. The clock circuit that clocks the remaining receiver portions can be any clock operating above some minimum clock rate, which in the exemplary 4096-search bin architecture is not less than about 65 MHz (64*1.023). The architecture is thus compatible with baseband architectures in which the DSP or other processor runs at some rate between 70 and 105 MHz.

In FIG. 4, the output of a Doppler NCO 318 is sampled and parallelized to two R2 registers 322 (only one of which is illustrated) in a manner similar to the input signal segmentation sequence. The number of samples in the R2 register is either 128 samples or 126 samples, depending on the segment length output of the Div128/126 divider block 314. The R2 registers are coupled to a multiplier block 326 by a multiplexer 328. This multiplexer arrangement allows on parallelized R2 Doppler wipeoff waveform to remain constant for a number of clocks and be fed into the flash correlator, while another R2 Doppler wipeoff waveform is prepared by the NCO. In the exemplary embodiment, the Doppler Generator has a limited number of clock cycles available to generate the 128 or 126 Doppler samples loaded into the R2 register. Doppler signal generator designs suitable for use with the exemplary architecture include using four traditional NCO's in parallel, or a SIN/COS state-transition computer.

Figure 6A:
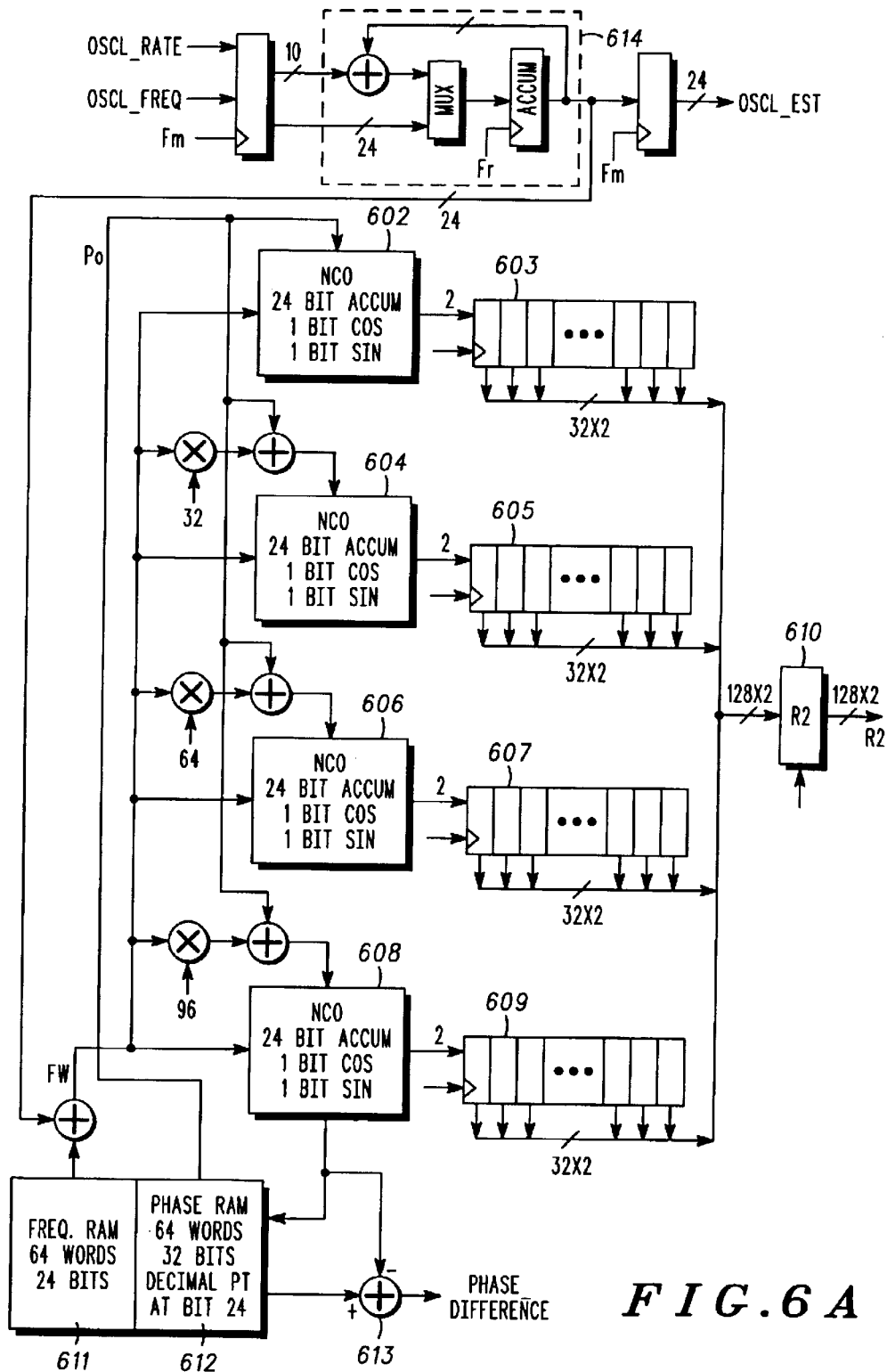
FIG. 6a is an exemplary Doppler generator block diagram.

The exemplary embodiment has a 32-clock cycle limit in order to load the R2 register for the next correlation. In FIG. 6a, four NCO's 602, 604, 606 and 608 create the Doppler pattern for the register 610. If not for the 32 clock cycle limit, then a single 24 bit NCO that generates a COS and SIN output (one bit each) would be sufficient to create the 128 I & Q samples. The 1-bit SIN output of NCO is the MSB of the integrator (bit 23 of a 24 bit NCO), while the COS output is the EXOR of the MSB with the next lower bit of the integrator (bits 23 and 22). The two output bits of the NCOs are delivered to corresponding 128 state serial to parallel shift registers 603, 305, 607 and 609 when the 128 samples are created, and then the R2 register 610 captures all 128 states simultaneously.

In the exemplary embodiment having a 32-clock cycle limit, parallelization reduces the number of clocks at each stage. The four NCO's in FIG. 6a each have the ability to load the starting phase and frequency at clock zero. The $1^{st}$ NCO creates the Doppler pattern for samples 1 through 31, while the $2^{nd}$ NCO generates the pattern for sample numbers 32 through 63, the $3^{rd}$ NCO creates data for samples 64 through 95, and the $4^{th}$ NCO for samples 96 through 128. Since the NCOs are clocked simultaneously, it takes only 32 clocks to create all 128 samples. The starting phase of the $2^{nd}$ through $4^{th}$ NCO are computed as follows: $2^{nd}$ NCO Starting Phase=$1^{st}$ NCO Starting Phase+32*Fw; 3rd NCO Starting Phase=$1^{st}$ NCO Starting Phase+64*Fw; and 4th NCO Starting Phase=$1^{st}$ NCO Starting Phase+96*Fw. The final phase stored in $4^{th}$ NCO after the $32^{nd}$ system clock is written back into a Phase RAM 612 for use during the next R1 register sample. For the signal segment having only 126 samples, the $4^{th}$ NCO is short cycled only 30 clock cycles.

The phase stored in RAM 612 is stored in 32 bit wide words. The lower 24 bits represent fractional phase of one carrier cycle, while the upper 8 bits represent integer carrier cycles accumulated. The word size of the RAM 612 is 64 words. The frequency RAM 611 also contains 64 entries but stores only the 24 bits representing a frequency word of a desired satellite/Doppler bin. The 64 words contained in the frequency RAM 611 and phase RAM 612 can be allocated to one or more satellites, each word corresponding to one Doppler bin and one satellite. One NCO structure is time-shared to create Doppler signals stored in the R2 register to represent up to 64 possible Doppler signals. For example, 64 Doppler bins can be allocated to one satellite, consuming all 64 data words. Alternately, 32 Doppler bins can be allocated for two satellites, again consuming all 64 data words. Any combination of Doppler bins per satellite can be allocated, as shown in FIG. 3, as long as the total number does not exceed the 64 memory locations of RAM 612 and 611.

A phase difference circuit 613 shown on FIG. 6a is used to compute a PN phase delay correction to the PN code generator circuit. The phase difference need not be a 32 bit difference, rather, a 10 bit difference of the upper 10 bits of the 32 bit long phase word is sufficient, and reports a phase difference in integer and fractional cycles down to ¼ cycle resolution. The phase difference circuit computes a difference in phase that occurs for each Doppler signal generated (both integer and fractional cycles to ¼ cycle resolution) and passes the difference to the code phase computer block (60 on FIG. 1), and ultimately to the PN Code Generator block (40 on FIG. 1) so as to keep the code phase stationary in one code phase bin during an integration time. In this way, the R3 PN code signals are time-shifted to compensate for Doppler induced code phase shifts of the received signals and to keep the correlation sum stationary in one accumulation bin. It is well known that GPS signals are coherent between Doppler and code phase, so that the accumulated shift in range due to Doppler cycles can be used to compensate for code phase delays. For example, the GPS signal carrier frequency of 1575.42 MHz and the PN code chipping frequency of 1.023 MHz are coherent, that is, the same oscillator generating the carrier frequency is used to generate the PN code clock internally to each satellite. As such, each PN code clock represents 1575.42 MHz/1.023 MHz, or 1540 carrier cycles per PN code clock. By accumulating the Doppler carrier cycles (by accumulating the phase difference of the output of 613, it is possible to make continuous code phase adjustments so as to keep the replica PN code signal generated by 40 of FIG. 1 coherent with the received signal. Since the receiver of this design uses primarily ½ chip spaced samples (stored in R1, R2, and R3 registers), the number of integer Doppler signal cycles needed to be accumulated before making a code phase adjustment of ½ chip is ½*1540, or 770 carrier cycles. Consequently, by accumulating the phase difference quantities for each Doppler bin/satellite (generated on FIG. 6a and consumed in the code phase computer block 60 of FIG. 1), the code phase loaded into the PN generator block 40 of FIG. 1 is adjusted by ½ chip for every 770.0 accumulated Doppler cycles.

Depending on the RF implementation, the code phase computer may either add or subtract ½ chip from each accumulation of 770 cycles. For example, if the RF circuits use high-side injection or low side injection (that is, the local oscillator is higher or lower than the desired signal), the received signal may cause a decreasing code phase accumulation or an increasing code phase accumulation. For this design, the processor can set a parameter called APAD, or auto-phase advance direction register, which controls if the accumulated Doppler cycles add or subtract from code phase.

FIG. 6a also illustrates a compensation circuit that accounts for reference oscillator offset frequency and the rate of frequency change. These parameters, OSCL_RATE and OSCL_FREQ, are estimated by the controlling microprocessor, and are written by the processor to offset all Doppler measurements for all satellites, thus accounting for reference oscillator offset frequency. The parameters are clocked into a 32-bit accumulator 614 by an Fm clock signal or a measurement epoch clock. The accumulator runs at a clock rate synchronous with every $16^{th}$ R1 register load cycle, or once every 1 millisecond. The output of the accumulator changes by one addition of the OSCL_RATE input parameter for every 16 new R1 register load cycle. The accumulated sum of OSCL_FREQ and OSCL_RATE*N can be observed by the processor on the OSCL_EST register, as it is captured on the next measurement epoch output clock which is synchronous with the interrupt. Bit alignment is as follows: The 24 bits of OSCL_FREQ are aligned up-shifted by 8 bits into the accumulator. The 10-bit OSCL_RATE parameter is bit-aligned with the accumulator. The output 24 bits that drive the OSCL_EST register and that feed into the parallel NCO are up-shifted by 8 bits, that is, these outputs observe the $31^{st}$ through $8^{th}$ bit of the accumulator. The range of the OSCL_RATE parameter is between a maximum OSCL_RATE=1000*(4*0.1220 Hz)= 488 Hz per second and a minimum OSCL_RATE=1000* (0.1220/256 Hz)=0.476 Hz per second.

The code phase computer block 60 of FIG. 1 performs the following functions:

a) Keeps track of the absolute code phase for each segment in memory. The processor will read the code phase directly from the code phase computer memory.

b) Accumulates Doppler induced changes in code phase by counting Doppler cycles (auto phase advance in code phase).

c) Computes the integer number of half chips (pre-positioning data) that the PN code generator will use during the next application of the signal, including auto-phase advance components.

d) Compensates the integer code phase half-chip offsets based on the segment number in R1.

e) Accounts for processor commanded manual adjustments to the code phase in units of Doppler carrier cycles via a processor write able parameter called the MANL_CP_ADJ input.

The code phase computer must accumulate the code phase for periods when the PN generators will need a pre-positioning target code phase for each segment. As such, it must compute a starting code phase for each BIN_LNGTH segment in the coherent and non-coherent RAM 16 times per millisecond, corresponding to the 16 different segments stored in the R1 register per millisecond. As is the case in the Doppler generator block 50 of FIG. 1, the code phase computer block 60 of FIG. 1 needs working RAM in order to keep up to 64 unique code phase registers.

Figure 6B:
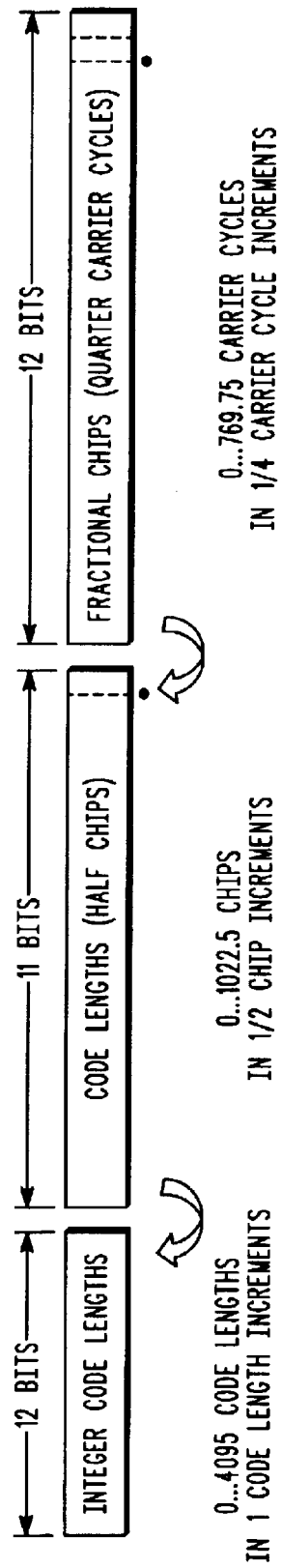
FIG. 6b is an exemplary code phase format maintained by a code phase computer.

For convenience, the following format is proposed for the code phase registers, the format is maintained by the code phase computer. Each register is subdivided into three segments as shown in FIG. 6b. The code phase stored in each register refers to the code phase delay of the $1^{st}$ ½ chip element in each memory segment. The code phase delay for other elements within each segment is simply based on the number of integer ½ chips away from the $1^{st}$ element of the segment.

Fractional chips are accumulated in units of ¼ carrier cycles in order to be compatible with the Doppler generator change-in-phase output. The exemplary Doppler generator computes the total number of ¼ carrier cycles within each R1 register processed for each correlator segment contained in the coherent RAM. As such, the fractional chips portion of the code phase accumulator takes on values of zero through 769.75 cycles, after which it causes a carry into the code lengths portion of the accumulator. At GPS L-band signal, for which the PN code and carrier are coherent, there are 1540 carrier cycles for each PN code chip, or 770 for a ½ chip length. Consequently, in order to maintain coherence and accommodate Doppler induced code phase delay changes, it is this process of accumulating 770 carrier cycles and then carrying forward into the next field (half chip delays) that accomplishes the process called auto-phase advance.

Likewise, the Code Lengths portion of the accumulator takes on values between zero and 1022.5 chips in ½ chip delay increments, or integer values between 0 and 2045. When the code lengths portion rolls over, the integer code lengths portion of the accumulator is incremented one time. The total number of bits containing the integer code lengths portion of the accumulator is set based on the maximum time expected to track a satellite (in a tracking mode, 10 hours), and the maximum rate of change for such a signal.

The algorithm to be applied by the code phase computer is best described in a C-code equivalent notation. The architecture of the module can be represented by an ALU, bit-shifter, and RAM block. The actual architecture is not important, as long as it performs the described algorithm. The primary requirement is that the code phase computer complete its update of the code phase parameters for all satellites and all Doppler signals needed (unique values of R2) and deliver the predicted pre-position code phase to the PN generator within the minimum number of system clock cycles, 32 cycles. The algorithm is described in an initialization mode and a running mode.

In the Initialization mode (before an integration dwell period begins), the following occurs:

For each satellite segment in the code phase computer memory, Integer_Code_Lengths[i]=0;

Code_Lengths[i]=CP_OFFSET[i] (copy of the code phase offset register stored in the configuration block);

Fractional_Code_Phase[i]=N*Delta_Cp; where N=the bin number for any block of segments having more than one defined NUM_BINS, and Delta_Cp is a change in code phase for subsequent bins of the same satellite, generally in integer carrier cycles and thus can represent a step size offset of the PN code of much less than ½ chip. For example, Delta_Cp can be 77 carrier cycles, which allows for PN code offset of 77/1540 chips, or 0.05 chips. Delta_Cp may thus be used to offset subsequent bins by an amount proportional to Delta_Cp/1540 chips. The parameter Delta_Cp is controllable per satellite by the controlling processor and can be set to any integer carrier cycle value, thus the stepsize in offsets for multiple code phase bins on a particular satellite can be in steps as small as ¹⁄₁₅₄₀ chips, or 0.000649 chips. In this way, the delay difference from one bin to another can be adjusted to much finer than ½ chip delay.

In a Run Mode—

This process generally runs some time after the Doppler generator has generated an R2 for the selected satellite/Doppler bin. The process to update the code phase after each R1 segment is processed for each satellite for each coherent RAM segment is:

```
Fractional_Chips = Quarter_Cycle_Count (from Doppler Gen) +
MANL_CP_ADJ (also in quarter cycles);
MANL_CP_ADJ = 0; (after the last bin is updated for this satellite);
If(APAD == 1) /* ** Code Phase Increases with each 770 Doppler
Cycles ***/
{
    If(Fractional_Chips >= 770.0 cycles)
    {
        Fractional_Chips -= 770.0;
        Code_Lengths += 0.5;
        If(Code_Lengths >= 1023.0)
        {
            Code_Lengths -= 1023.0;
            Integer_Code_Lengths += 1;
        }
    }
    else If(Fractional_Chips < 0.0 cycles)
    {
        Fractional_Chips += 770.0;
        Code_Lengths -= 0.5;
        If(Code_Lengths < 0.0)
        {
            Code_Lengths += 1023.0;
            Integer_Code_Lengths -= 1;
        }
    }
}
else /* Code Phase Decreases with each 770 Doppler Cycles */
{
    If(Fractional_Chips >= 770.0 cycles)
    {
        Fractional_Chips -= 770.0;
        Code_Lengths -= 0.5;
        If(Code_Lengths < 0.0)
        {
            Code_Lengths += 1023.0;
            Integer_Code_Lengths -= 1;
        }
    }
    else If(Fractional_Chips < 0.0 cycles)
    {
        Fractional_Chips += 770.0;
        Code_Lengths += 0.5;
        If(Code_Lengths > 1023.0)
        {
            Code_Lengths -= 1023.0;
            Integer_Code_Lengths += 1;
        }
    }
}
```

Creation of the Next PN Code Preposition Data

The next time this particular satellite segment needs to be pre-positioned by the PN code generator, the PN Code Generator is given the integer count of half-chips stored in the Code_Length Register offset by the segment number of the R1 data. More specifically, Preposition_PN_Count= 128*Seg_Num+Code_Length_Register; Where Seg_Num refers to the R1 data segment number (0 through 15). Note that the multiply by 128 can be implemented by a simple bit shift of 7 places. Finally, the Preposition_PN_Count needs to be compensated for any overflow or underflow, with a function such as:

If(Preposition_*PN*_Count>=1023.0) Preposition_*PN*_Count-= 1023.0;

If(Preposition_*PN*_Count<=0.0) Preposition_*PN*_Count+= 1023.0.

In FIG. 4, the output of a PN replica code generator 320 is sampled and parallelized to two R3 registers 324 (only one of which is illustrated) in a manner similar to the input signal segmentation sequence. The number of samples in the R3 registers is either 128 samples or 126 samples depending on the segment length output of the Div128/126 divider block 314. The R3 registers are coupled to the multiplier block 328 by a multiplexer 330.

Figure 7:
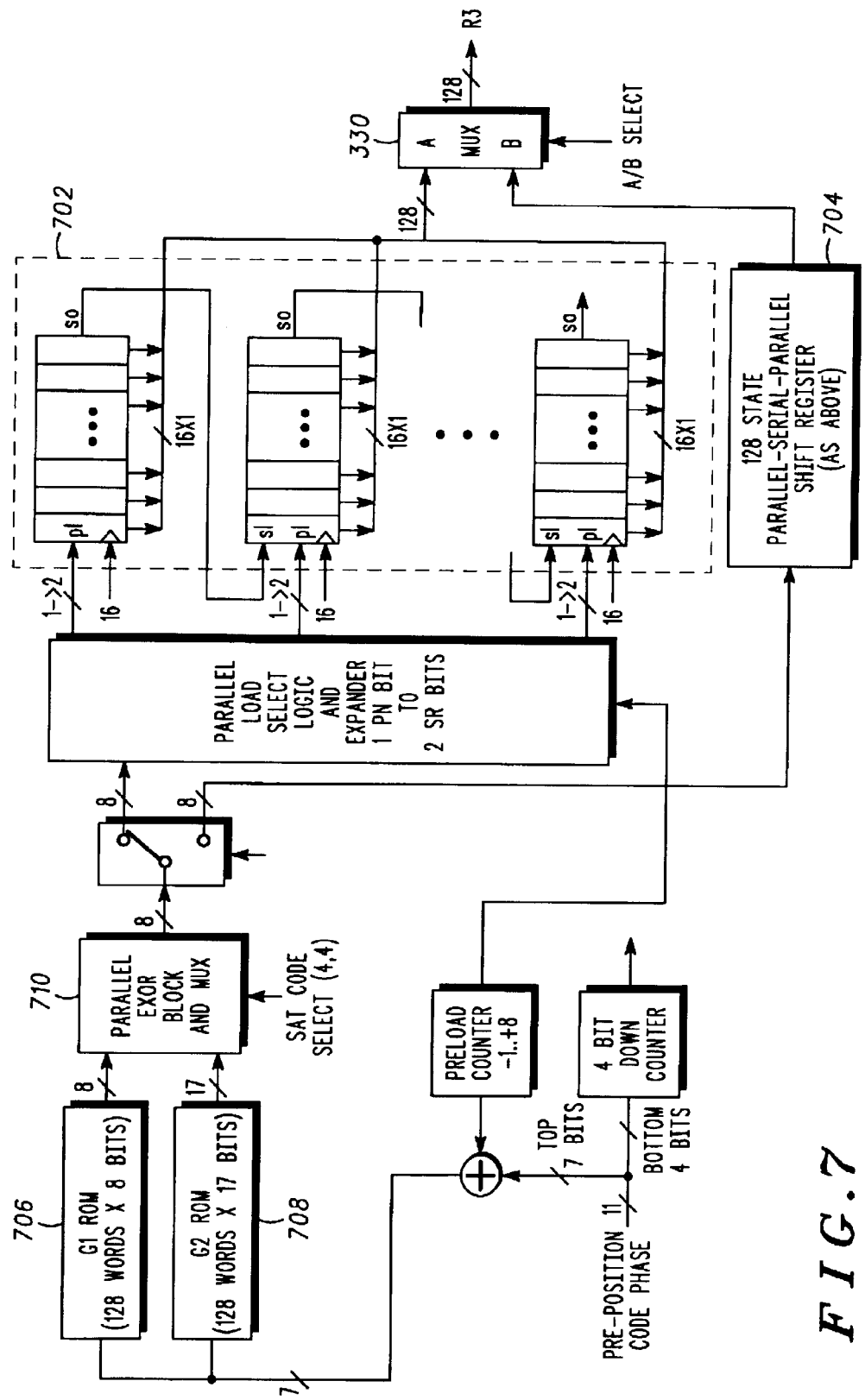
FIG. 7 is an exemplary PN code generator block diagram.

In FIG. 7, an exemplary ROM based PN code generator generates all 128 states of the R3 register within the required 32 system clocks. The contents of shift registers 702 and 704 are deterministic, wherein each of 1023 states defines one particular bit of a selected code. The states of the shift registers are stored in a corresponding lookup table ROM. The G1 lookup table ROM 706 requires 1023 bits (128 words by 8 bits), and the G2 lookup ROM 708 requires 2176 bits (128 words by 17 bits).

On one system clock cycle, the G1 and G2 ROM pair, in conjunction with the parallel EXOR and MUX Block 710, create 8 parallel bits representing 8 consecutive states of the output of the PN generator for a selected signal. The first bit coincides with the bit position (i.e., PN code bit state number) represented by the input address to the ROMs multiplied by eight. The R3 register captures 128 bits. Each bit from the PN generator is duplicated twice (R3 contains a 2.046 MHz rate sampling of the 1.023 MHz PN generator), so that the G1/G2 and Parallel EXOR and MUX block must create 64 bits of the PN sequence for preloading. The R3 register is organized as 8 copies of a 16-bit long shift register. The last eight copies contain 128 bits of the R3 register, while the first is a shift-register load register loaded by the G1/G2 ROM and Parallel EXOR and MUX block.

The circuit parallel loads 16-bit shift registers. In a preload mode, the circuit successively loads 9 registers in nine clock cycles. After the shift registers are loaded, the state of the R3 register represents that portion of the selected PN code, the $1^{st}$ bit of the shift register being that bit coinciding to the closest state number (within 16 clock cycles of the target state). The shift registers are then clocked the remainder number of clock cycles to preposition the R3 register into the desired starting state, the state computed by the code phase computer and delivered to the PN generator by the Preposition_PN_Count parameter. The top 7 bits of the propositioning count go directly to the ROMs. An address count of −1 through +8 is added to the address to generate the address looking up the contents of all 9 of the 16 bit shift registers that make up the R3 register. The lower 4 bits (i.e., the remainder) represent the integer number of clocks necessary to put the R3 register into the desired initialization state.

Figure 8:
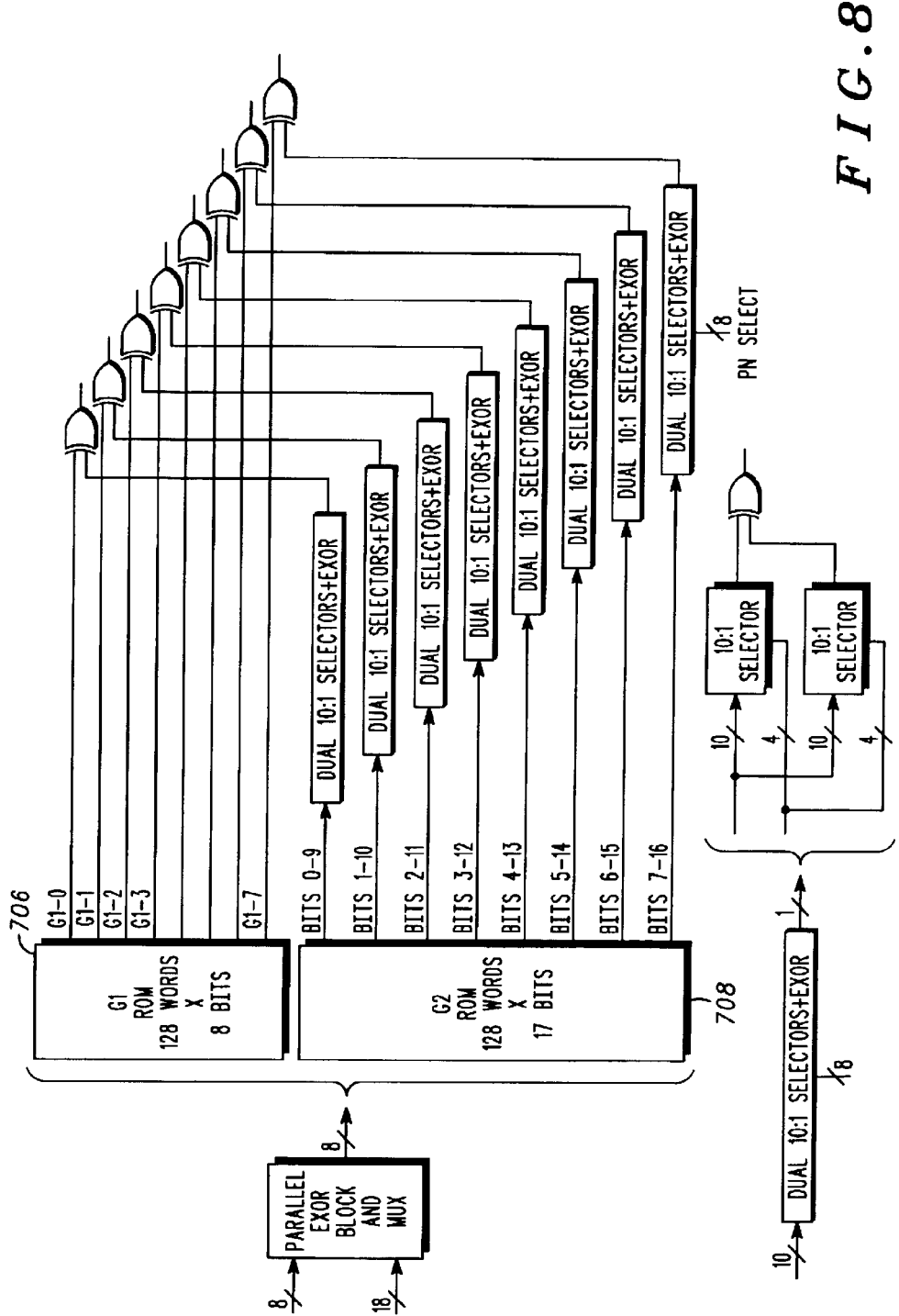
FIG. 8 is a detailed portion of the PN code generator of FIG. 7.

As noted, there are two copies of the R3 registers, both driven by one copy of the G1/G2 ROM and Parallel EXOR and MUX block. In one embodiment, the two R3 registers alternate between a preload state and a run state. In a RUN mode, the R3 register is shifted once per clock. The next 16 bits of the code required are loaded into a LOAD register on the proper clock so that a continuous stream of PN bits are loaded into the R3 register. FIG. 8 is a more detailed block diagram of the Parallel EXOR and MUX block. To generate eight successive bits in one parallel clock cycle for any signal, the circuit duplicates the circuitry for exclusive OR-ing of any two bits from the G2 shift register along a 10-bit interval. Thus, two 10 bit data selectors and one exclusive OR gate are used for every bit of the eight. In addition, the G2 shift register ROM generates a total of 17 total state bits so that the 10 to 1 selectors can view the proper ten bit range for each of the 8 bits.

In FIG. 4, the correlation is performed by a 128 tap high speed flash parallel correlator 332 that correlates sample by sample the contents of the complex (two-bit I and two-bit Q) R1 register with the complex (one-bit I and one-bit Q) R2 register with the real one-bit R3 register, summing all taps to form a SUMI and a SUMQ output.

The mathematical operation performed by the correlator can be described in FIG. 9a and the accompanying pseudocode as follows: Assume that the R1 register consists of 128 samples of I & Q, called R1i[k] and R1q[k], where k is a sample number within the R1 register; 0<=k<=max. Likewise, the R2 register consists of 128 samples of I & Q, called R2i[k] and R2q[k]; 0<=k<=max. Finally, the R3 register consists of 128 samples of the real PN code sequence, called R3[k]; 0<=k<=max. IN the exemplary embodiment, the value of max changes between 127 and 125 depending on whether the R1 register contains a 128 sample R1 value or a 126 sample R1 value. The R1i and R1q terms can take on the value of +1, +3, −1, and −3. The R2i and R2q can take on the values of +1 and −1. The R3 values can carry the values +1 or −1.

The flash correlator forms the product of sums as follows:

For(*k*=0; *k*<max; *k*++)Sum+=R3[*k*]*(R1[*k*]*R2[*k*]);

Expanding this expression to show the complex operations produce

For (*k*=0; *k*<max; *k*++)Sum+=R3[*k*]*[(R1i[*k*]+jR1q[*k*])*(R2i[*k*]+ jR2q[*k*])];

Expanding further and collecting in-phase and quadrature components produces:

For (*k*=0; *k*<max; *k*++)Sum*i*+=R3[*k*]*[(R1i[*k*]*R2i[*k*])−(R1q[*k*] *R2q[*k*])];    [1]

For (*k*=0; *k*<max; *k*++)Sum*q*+=R3[*k*]*[(R1i[*k*]*R2q[*k*])+(R1q[*k*] *R2i[*k*])];    [2]

Finally, the complex product of R1 times R2 can be described as the product register, Pi[k] and Pq[k], where:

P*i*[*k*]=(R1i[*k*]*R2i[*k*])−(R1q[*k*]*R2q[*k*]);    [3]

P*q*[*k*]=(R1i[*k*]*R2q[*k*])+(R1q[*k*]*R2i[*k*]);    [4]

The product registers Pi and Pq are constant for each R1 and R2 value and contain max elements. The final sum (Sumi and Sumq) can be written in terms of R3 times the product registers (Pi and Pq) as follows:

For(*k*=0; *k*<max; *k*++)Sum*i*+=R3[*k*]*P*i*[*k*];    [5]

For(*k*=0; *k*<max; *k*++)Sum*q*+=R3[*k*]*P*q*[*k*];    [6]

To maximize the number of correlations performed in a time interval, these sums, Sumi and Sumq, in equations [5]

and [6] are computed in one clock cycle, which may be pipelined, by one large block of logic that accomplishes the function.

Figure 9A:
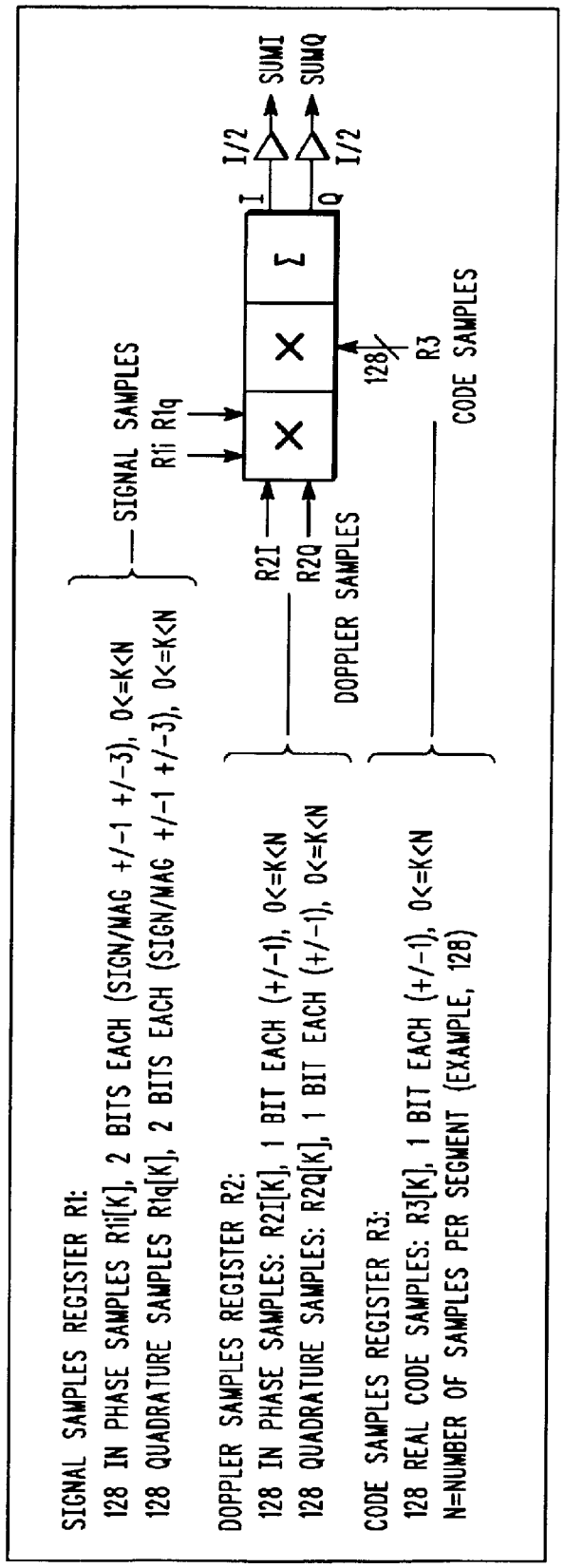
FIG. 9a is an exemplary mathematical functional representation of the correlator.

FIG. 9a illustrates the preferred embodiment of the flash correlator block. Equations [1] through [6] describe the mathematical operations performed on each element of the Product register, Pi and Pq, and the subsequent outputs Sumi and Sumq. The specific design of the flash correlator is highly dependent on the method of encoding the data associated with the R1 and R2 data inputs. The encoding of the I & Q samples of the R1 input samples is assumed to be:

| Two Bit Encoding | Value |
|---|---|
| 00 | +1 |
| 01 | +3 |
| 10 | −1 |
| 11 | −3 |

And the One-Bit I & Q samples of R2 are encoded as:

| One Bit Encoding | Value |
|---|---|
| 0 | +1 |
| 1 | −1 |

The One-Bit samples of R3 are encoded as:

| One Bit Encoding | Value |
|---|---|
| 0 | +1 |
| 1 | −1 |

Figure 9B:
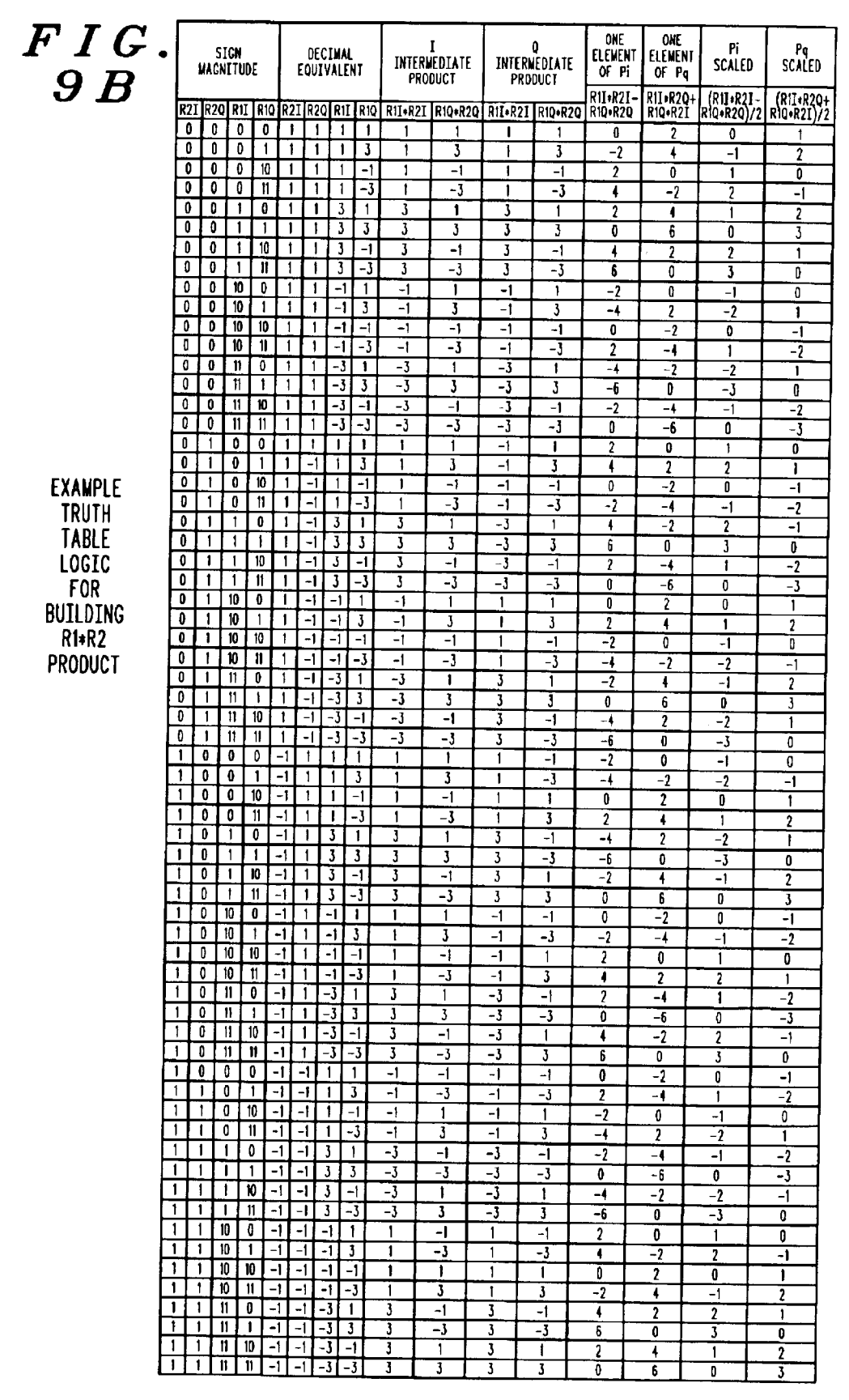

FIG. 9b also illustrates all 64 possible combinations of the bit patterns associated with the two bit I & Q R1 samples multiplied by the one bit I & Q samples of the R2 register, i.e., the product register 326. Thus it is not necessary to encode the samples into twos-complement notation in order to form the inner products of R1*R2. All 128 outputs of the Pi[k] and Pq[k] logic block multipliers are summed in separate I & Q data paths to create the Sumi and Sumq outputs. Note that the output of the summer is truncated by one bit (see the output path in FIG. 9a) because the output of the flash correlator summer is always an even number. A logic block simply has to duplicate the truth table of FIG. 9b, which includes the divide-by-two embedded in the table. Column "Pi_scaled" is different from column "one element of Pi" by a factor of two, and column "Pq_scaled" is different from column "one element of Pq" by the same factor of two. Encoding the four input states (+1, +3, −1, −3) of the R1 data in this manner and accomplishing the multiplication with logic elements avoids twos complement math, which requires one more data bit (3 each for I & Q R1 register, for example) in the data path and uses additional hardware elements.

Figure 9C:
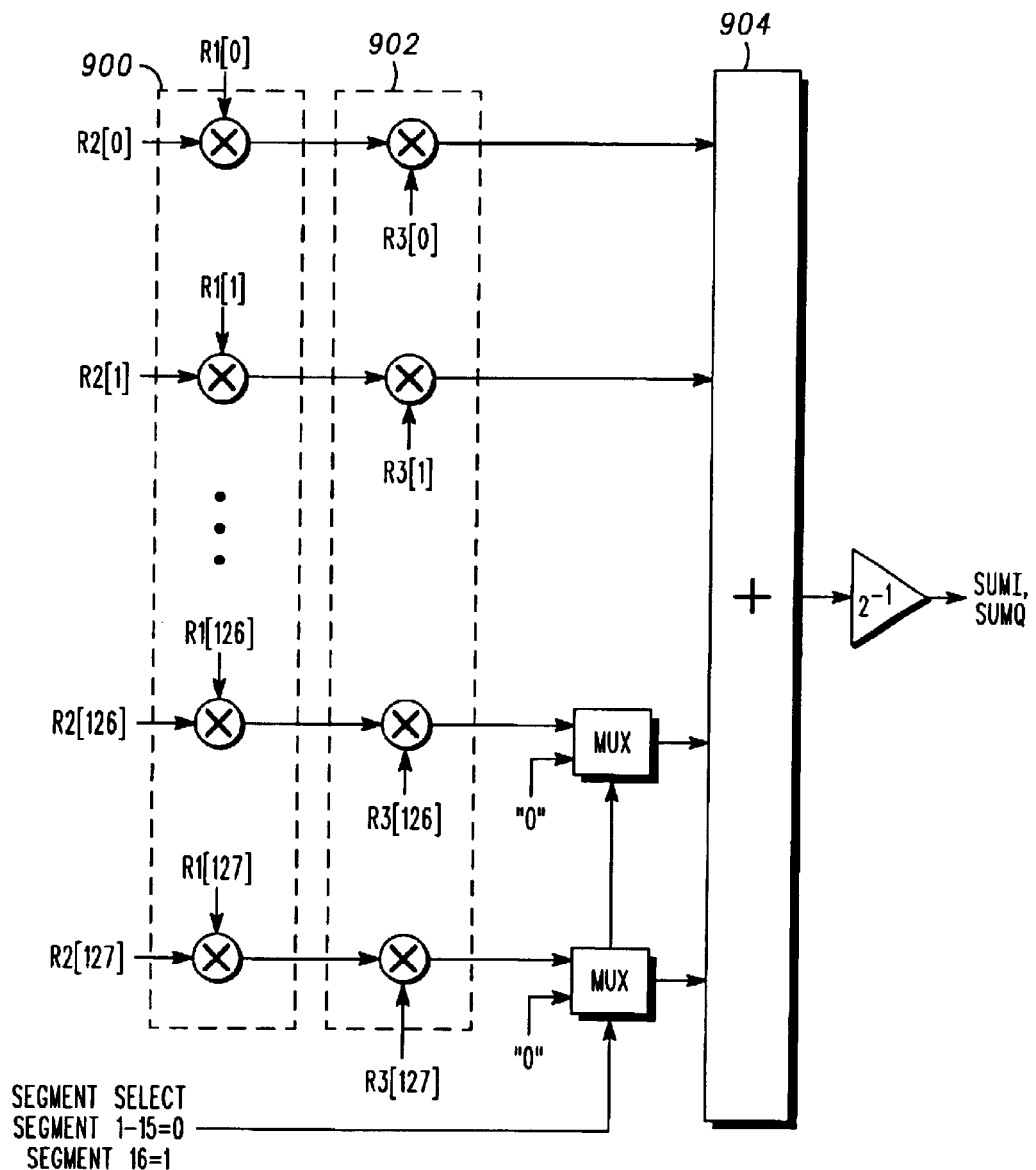
FIG. 9c is an exemplary correlator circuit.

FIG. 9c is an exemplary correlator block diagram including a first and second multiplier blocks 900 and 902 corresponding to the multiplier blocks 326 and 332 in FIG. 4, respectively. FIG. 9c also illustrates summation of the outputs of the 128 parallel correlators, depending on the segment number at a summation block 904, which corresponds to a summation block 333 in FIG. 4. In the exemplary embodiment, the R1 register output is 128 samples long for all signal segments except for the last segment, which is 126 samples long. The outputs of the correlators 127 and 128 are ignored during summation of the 16th signal segment under control of the Segment Select signal.

Figure 10A:
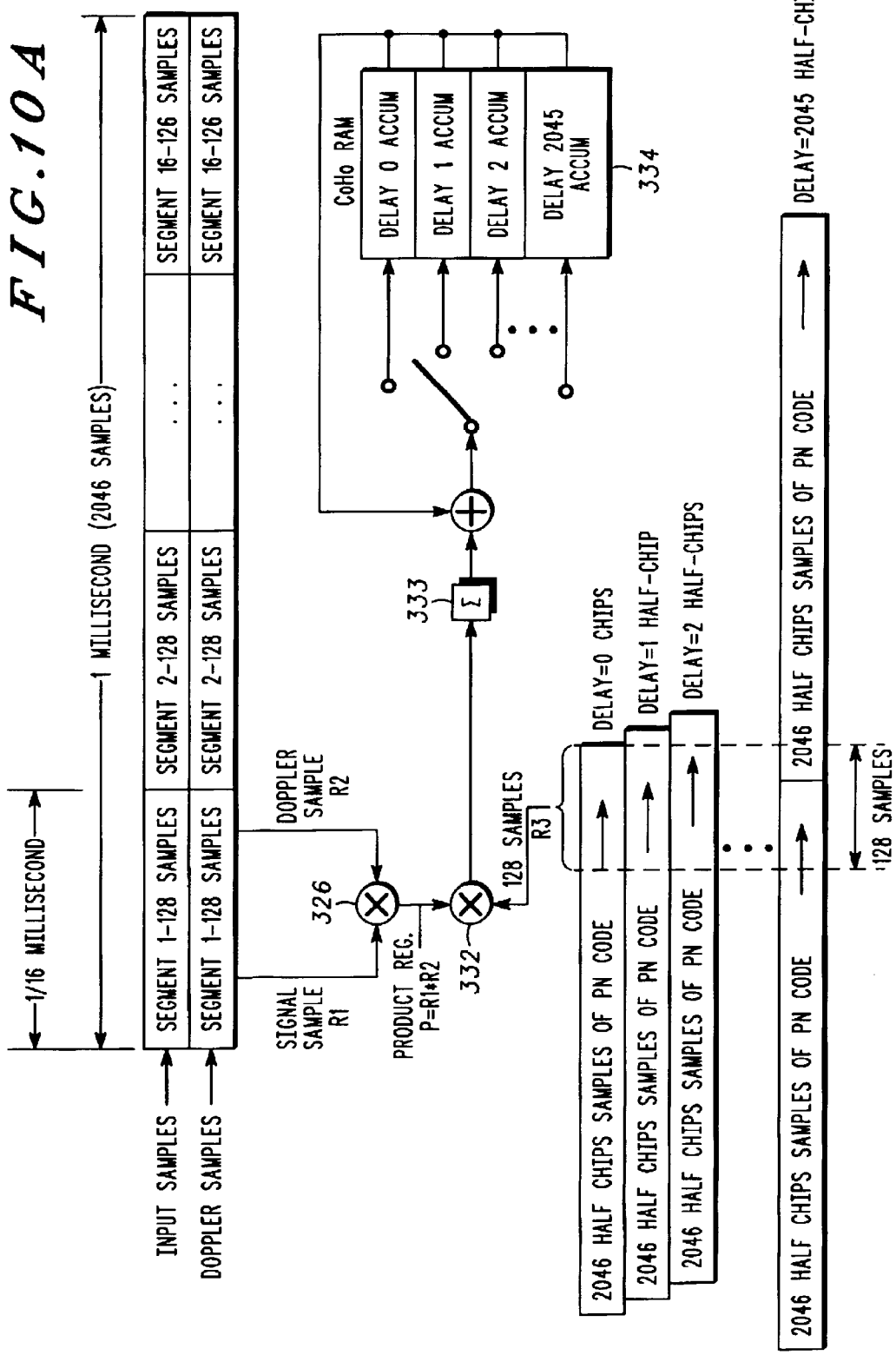
FIG. 10a is an exemplary schematic processing flow diagram with half-chip delay correlation increments.

The correlation process is illustrated schematically in FIG. 10a. The input samples from the R1 register and the R2 register are multiplied to produce a product register P. The product register P is then held constant while a pre-determined range of code phase delays of the replica PN generator (stored in the R3 register) is applied to a final multiplier. All 128 states of the multiplier outputs are then summed together in the summer block 333.

The R3 register contains 128 states of the replica PN code for a particular code phase delay. For each code phase delay, a coherent RAM memory 334 is used as a large number of separate accumulators, one for each of the possible code phase delays tested. In a half-chip mode, the contents of the R3 register is advanced one half-chip delay per clock cycle, and the coherent RAM 334 is advanced one address so that each memory location in the coherent RAM represents successive one half-chip delay trials of code phase delay. For example, the results of the correlation of the R3 register for delay zero is written into the delay-zero accumulator address, the results of the correlation of the R3 register for delay one (half-chip different) is written into the delay-one accumulator address and so-forth. Up to 2046 half-chips are tested per signal or satellite representing all possible code phase delays, or a pre-determined number of code phase delays are tested, filling only the corresponding number of coherent RAM memory locations. In a one-chip mode (described later and shown in FIG. 10b), successive coherent RAM addresses represent one chip spaced delays.

Every one of the 2046 possible states of the R3 register form a unique SUMI and SUMQ output that is summed into the coherent accumulation RAM 334 in successive memory locations. The receiver is programmable so that coherent accumulation is over N milliseconds, wherein each satellite is programmable over a different value of N by storing an N value for each satellite searched and applying the N value to the coherent accumulator when the particular satellite is being searched.

The parallelization of the receiver may be extended in architectures where more than 4096 search bins by merely including multiple copies of the receiver or portions thereof or by increasing the size of memories 70 and 80 and increasing the system clock rate accordingly. For example, doubling the word-count of memories 70 and 80 would result in 8192 memory locations. This would give the receiver the ability to compute 8192 unique satellite/Doppler/code phase trial bins, instead of the original 4096. In order to process all 8192 satellite/Doppler/code phase trial bins within one update cycle of the R1 register (1/16 of one millisecond), the system clock rate would have to be greater than or equal to 128*1.023 MHz. Another way to do this is to change the segment length to more or less than 128 samples. For example, if the segment length is made to be 256 samples long, then the system would segment the 1 millisecond long PN code by performing partial correlations over seven 256 sample-long segments and one 254 sample long segment in order to cover the 2046 half-chips of code phase test space. It also gives the receiver more time per R1 update cycle to perform the sequential partial correlations, allowing for a system clock rate that is half of that originally to accomplish the same number of correlations (4096), or by allowing for processing twice the number of correlations (8192) if the clock rate is held to the same value.

Once a spread spectrum signal segment is stored into the R1 register, subsequent processing is independent of input clock rate. It is therefore possible to process the entire code phase space for 1, 2, 4 or 8 signals or satellites as long as the correlator, PN generator, Doppler NCO and accumulation RAM run fast enough. For example, a full code phase space search on 8 satellites may be performed if the PN code generator, R3 register, and Coherent RAM are clocked at (8*2048 correlations)/(1/16*0.001 sec) MHz, the accumulation RAM is expanded to hold 8*2048 words, and by timing accordingly the multiplexers and coherent accumulation RAM.

The exemplary architecture exhibits clock-rate scalability, which can exploit increased clock speeds associated with semiconductor process shrinks. As noted, the correlator arrays can be programmed to run at a variable clock rate depending on the total number of search (code phase and Doppler) bins necessary for a particular problem.

While computing the correlation tests for up to 2046 possible delays for one satellite, the contents of the R1 register remains stationary during the collection time of the next segment (approximately 1/16 KHz of time in the exemplary embodiment). During this period of time, a predetermined number of code phase and/or Doppler bins are searched for the segment collected previously. When all code phases have been searched for one Doppler bin, a new value can be loaded into R2 to search a new Doppler bin.

Figure 11:
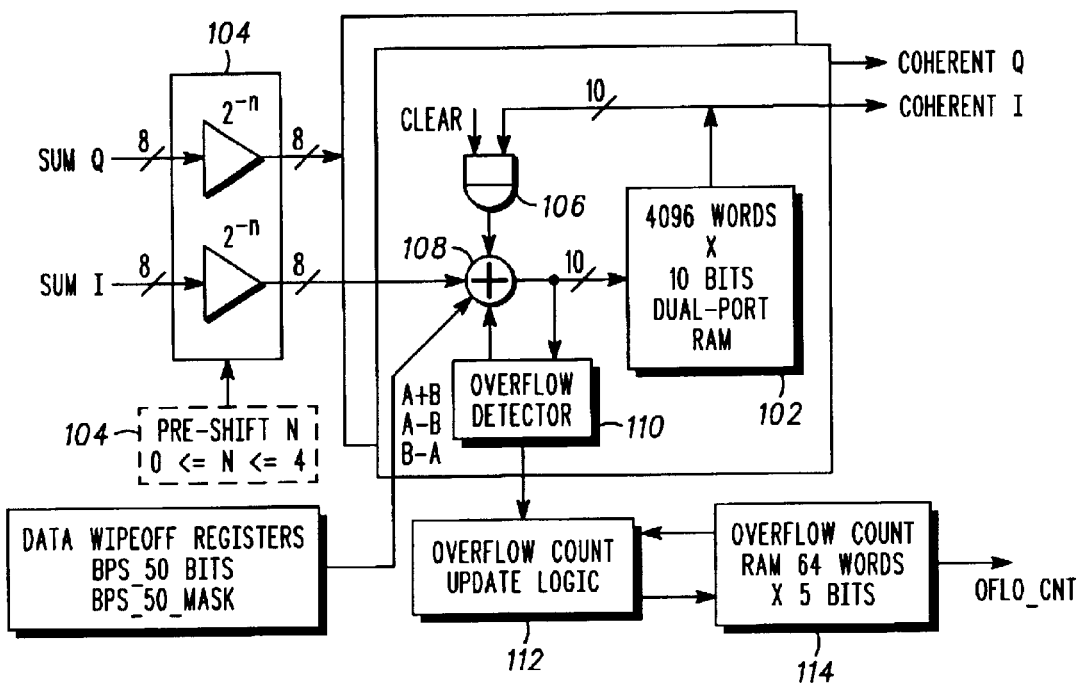
FIG. 11 is an exemplary coherent integration module block diagram.

In FIG. 11, the coherent integration block accumulates up to 4096 in-phase and quadrature correlation sums in a memory array 102 consisting of 10 or more bit-wide integrators for SUMI and SUMQ signals. The array is segmented into blocks corresponding to a particular satellite PN code, code phase range, and Doppler frequency. Each of the 4096 I & Q memory locations may be considered as one accumulator, which holds the correlation results for one satellite, one code phase delay (in half-chips), at one Doppler frequency. The array 102 is preferably configured with separate read/write input paths to pipeline processing in a single clock cycle per memory address update. Other configurations are also possible as long as the processing is limited to one clock cycle per memory element update, including, for example, a dual single port memory scheme where A and B memory is used to separate the read and write processes, doubling the clock frequency on a single port memory to allow one cycle read, one cycle write, and a true dual-port memory design.

The flash correlator sum corresponding to one particular code phase delay, one satellite, at one Doppler frequency is input to the coherent memory via SUMI and SUMQ inputs. Each clock cycle delivers correlation sums for one correlation on the two inputs SUM1 and SUMQ. The flash correlator outputs are truncated a fixed number of bits as specified by a pre-shift parameter at 104 to reduce dynamic range, under control of the controlling processor or DSP. The pre-shift value is configurable for each satellite searched by storing a pre-shift value for each satellite searched and by multiplexing the pre-shift value to the shifter when the particular satellite is being searched. The address sequencing starts at address 0 and increments one address for every correlator sample on SUMI and SUMQ. The 4096 words of the coherent memory array are updated before the next R1 sample is available.

The coherent accumulators sum over an integer number of milliseconds corresponding to a selectable PDI register setting for each satellite. The integration is integer-fixed point, with fixed point scaling of $2^{-n}$ on the input quantities SUMI and SUMQ. The coherent integration period can vary from 1 to 20 ms (one GPS navigation message bit time) in increments of 1 ms. For a 1 ms coherent integration, for example, sixteen successive R1 registers (corresponding to signal segments 1–16) are processed and summed into the coherent integration memory before the final sum is communicated to the non-coherent integration block 336 in FIG. 4. At the end of 1 ms, the coherent RAM segment is cleared. The coherent integration period can also extend beyond one bit-time (20 ms) provided the system has knowledge of a particular sequence of navigation bits. Precise local time knowledge to 2 ms is required for 20 ms coherent integration.

On the $1^{st}$ update to the memory (i.e., on the $1^{st}$ iteration of a coherent sum), an AND gate 106 driving a port of an adder 108 is cleared, forcing zeros into that port of the adder. The $1^{st}$ correlation results from the correlator are loaded directly into memory. Subsequent memory sums are formed by passing previous accumulations to the adder with the AND gate to form 4096 integrators. One R1 segment after the last sum of a PDI interval the AND gate 106 output is set to zero. The read function operates normally, fetching the desired sum from memory. The sum is passed to and captured by the non-coherent integrator block, discussed below. Finally, the $1^{st}$ sum of the next coherent interval is written to the memory address, beginning the process anew for the next coherent integration period.

In some modes of operation, the coherent integrator may overflow its 10 or more bit-wide dynamic range, for example, if the PDI is set to 20 milliseconds or higher and/or if the Pre-Shift scale factor is set low (example, to $2^0$ or $2^{-1}$), and signals are stronger than expected. Accumulation overflow may be prevented by adjusting the scale factor for each of the plurality of spread spectrum signals. In one embodiment, at least some results of correlating each of the spread spectrum signals are scaled by different scale factors, for example by lowering the PDI and/or by raising the Pre-Shift parameter.

In FIG. 11, an overflow detector 110 has an input coupled to the input to the memory array 102, and outputs coupled to the adder 108 and to overflow count update logic 112. When an overflow condition occurs, the integrator output is set to a maximum or minimum value. A counter 114 then records the number of overflow conditions, defined by one of 64 possible bins (bins here refer to the number of peak detector bins, Doppler registers) and sums the total as long as the non-coherent integrator is running. For example, if the non-coherent integrator is programmed to run for 200 ms and the PDI is set to 10 ms, then the overflow counter for that particular bin counts the total number of coherent integrator overflows in that bin during the entire 200 ms non-coherent integration "run" time. In this example, up to 20 overflows may be detected. The controlling processor can then read the output as part of the peak detector output to verify that none or only a few overflows occurred during the dwell.

Figure 12:
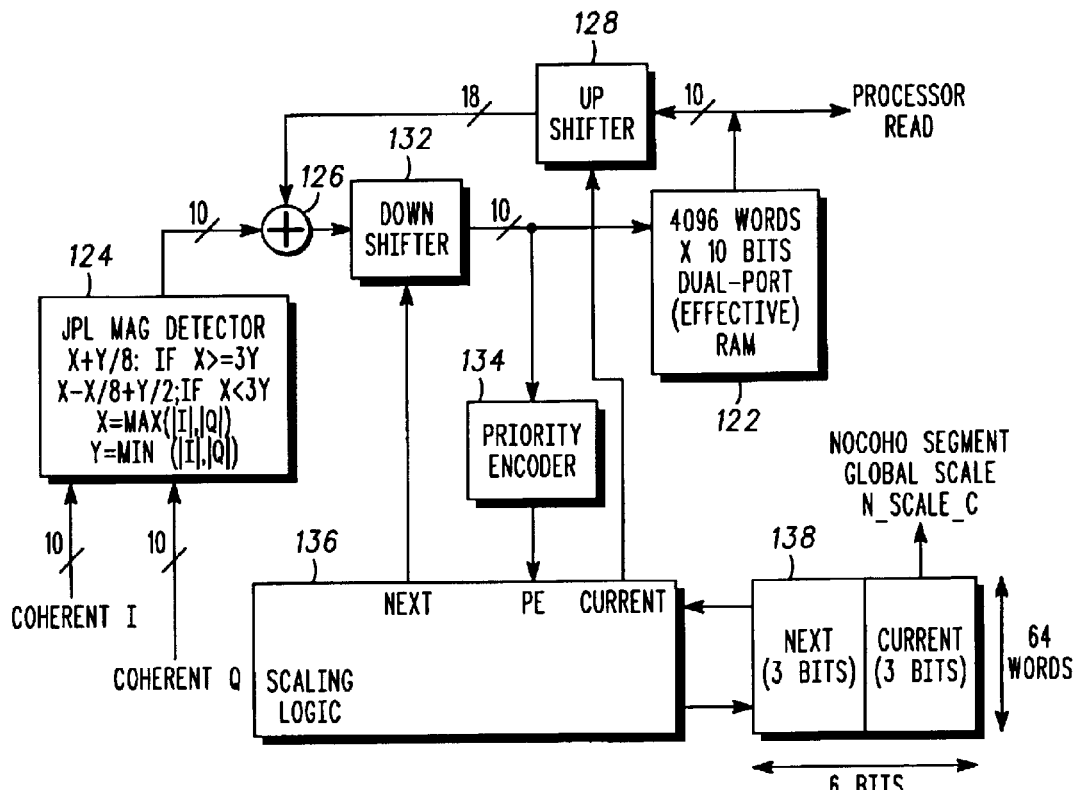
FIG. 12 is an exemplary non-coherent integration module block diagram.

In FIG. 12, a non-coherent integrator accumulates up to 4096 signal magnitude sums in a memory array 122 segmented the same as the coherent integration block discussed above. Each accumulation sum holds the correlation results for one signal or satellite, one code phase delay (in half-chips) at one Doppler frequency. As in the coherent integrator, each memory block uses a fixed-point scaling, for which a fixed-point scale factor is associated with the entire block. The coherent integrator provides 10 or more bits-wide coherent I & Q inputs to a JPL magnitude detector 124, which computes an approximation to I & Q signal magnitudes using the algorithm illustrated. The inputs are synchronous with the end of a particular segment's coherent integration interval.

The non-coherent integrator also includes an adder cell 126 with a 10 or more bit wide port from the magnitude detector 124 and an 18 bit input port from an UP shifter 128 that shifts contents of the non-coherent accumulation memory array 122 (10 or more bits wide) to an equivalent magnitude. The scaled output of the non-coherent memory is added to a new magnitude (most recent coherent sum), which is shifted by a down-shifter 132 to the 10 or more bits of dynamic range of the memory array.

A priority encoder logic block 134 records an output magnitude of the down-shifter, and inputs a latched PE signal to a scaling logic block 136 to shift a scale factor when necessary to prevent overflow conditions on subsequent accumulations. Particularly, when any memory element has an active MSB bit, the scaling logic 136 increments the scale by one count so that the next time the segment is accessed overflow is prevented by applying the proper scale. The scaling logic updates the contents of the non-coherent global scale factors RAM 138 after a PE status flag has been latched, before the next segment is processed. The non-coherent global scale factor RAM contains both a "current" scale and a "next" scale quantity, both of which are initialized to zero at the start of a non-coherent integration. Each scale quantity represents a number of bit shifts for the corresponding UP and Down shifters. The up shifter 128 gets the "current" scale factor and the down shifter 132 gets the "next" shift quantity. Zero means no shift, one means 1 bit shift, etc. The "next" scale is updated by adding the contents of the latched PE value to the previous "next" scale factor. Note that this can also be accomplished by using one "current" scale factor storage plus a single bit which indicates whether the next up-shift should be one less than the next down-shift. This is in contrast to storing a current and next exponent value and saves memory area in the scaling circuit. In either case, the entire correlator block is scaled by one exponential value or block value. In one embodiment, all subsequent accumulated magnitudes for one or more of the predetermined phase delays are scaled with a common scaling factor if it is determined that the subsequent accumulation of the greatest accumulated magnitude will result in an accumulation overflow.

In FIG. 4, a peak detector and output registers 338 are coupled to the non-coherent memory to aid the controlling processor in determining detection conditions and to reduce the throughput required to scan the integrator outputs for signal detection. The peak detector and registers also provide signal tracking (code and carrier) paths. In addition, the detector and registers relieve the processor from reading all 4096 words of non-coherent integration RAM and from testing for signal detection conditions on each segment of data in memory. The peak detector and output registers scan the non-coherent integration RAM once per RAM update.

Figure 13:
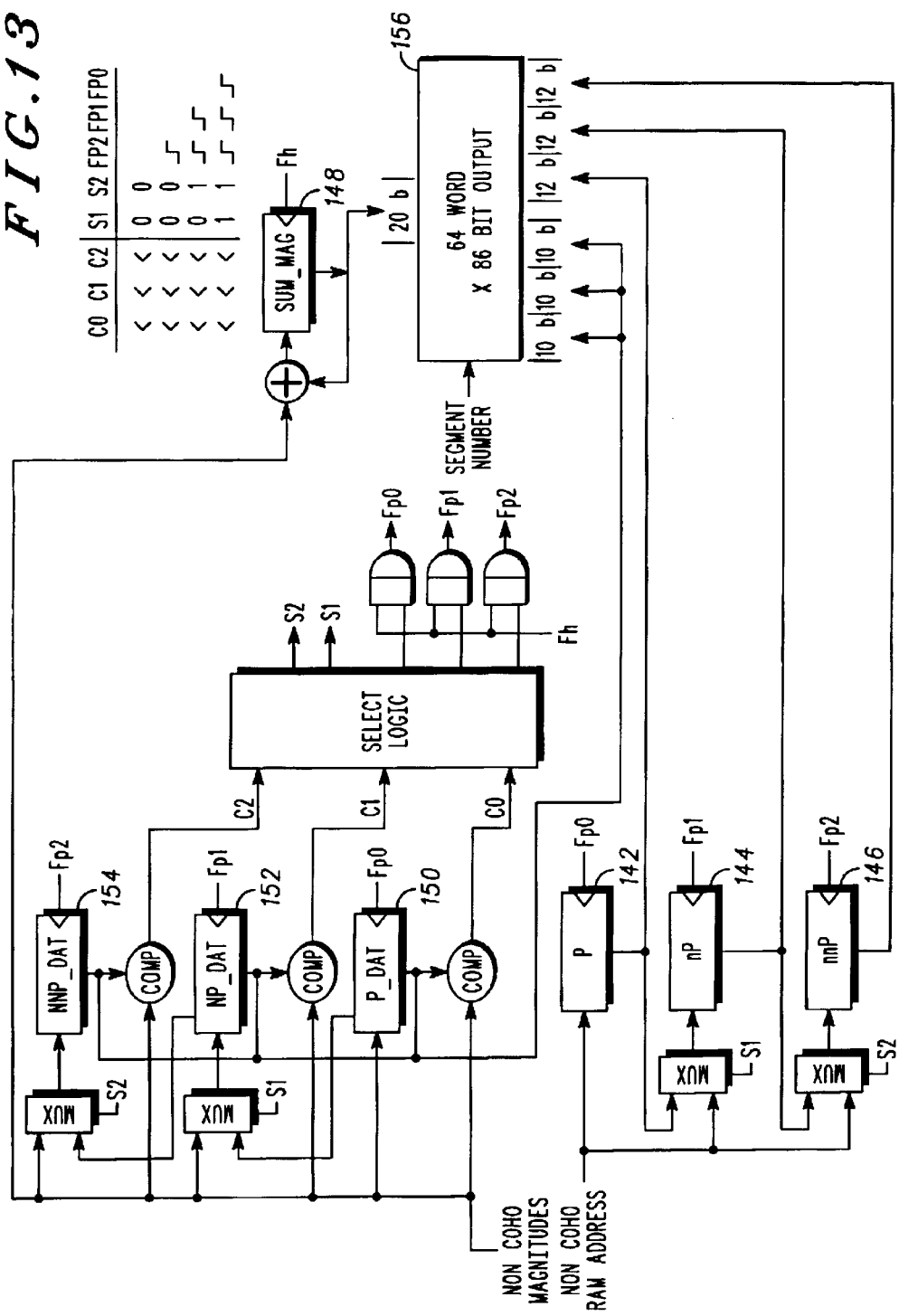
FIG. 13 is an exemplary peak detector and output register block diagram.

In FIG. 13, the peak detector comprises a register 142 for storing the address of the signal maximum in the segment (P), a register 144 for storing the address of the next signal maximum in the segment (NP), a register 146 for storing the address of the next, next signal maximum in the segment (NNP), a register 148 for storing the sum of all of the signal magnitudes in the segment (SUM_MAG), a register 150 for storing the maximum signal magnitude (P_DAT), a register 152 for storing the next maximum signal magnitude (NP_DAT), and a register 154 for storing the next, next maximum signal magnitude (NNP_DAT). A 64 word by 86-bit output register RAM 156 stores these parameters. Each RAM word coincides with one segment of data (one Doppler, one Satellite, and one code phase delay), and the bit positions associated with the memory coincide with the various elements. The output register RAM, when read by the controlling microprocessor, is mapped into 16 bit words (P, NP, NNP) and 32 bit words (SUM_MAG), and 16 bit words (P_DAT, NP_DAT, NNP_DAT), so that the least significant bit of each parameter shows up on the least significant data bus bit. Other values, such as coherent overflow count and non-coherent scale factors, can be updated in the output register at the same time the peak detector data is transferred to the output register RAM.

The sum of all signal magnitudes in the segment may be used to compute an approximate peak signal to average noise. The peak detector and output register function may run during the process of updating the non-coherent integrator (i.e., the $\frac{1}{16}$ millisecond segment of time corresponding to the termination of the coherent integration interval), or may run anytime during the period before the next non-coherent integrator update. In one embodiment, an approximate phase delay determination corresponding to a phase delay of the greatest magnitude is confirmed by determining whether a magnitude of the phase delay difference of first and second greatest correlation magnitudes is equal to one unit of phase delay.

A coherent RAM capture function, part of the output register block 91 shown in FIG. 1, can be used to capture and buffer (to be read later by the controlling processor) the coherent sums from one or more coherent memory spaces corresponding to a the actual code phase delay for one or more detected satellites. The coherent RAM capture buffer can then be read by the controlling processor in order to directly demodulate the satellite transmitted 50 BPS data sequence using traditional methods of demodulating the bi-phase data modulation. It is through this path that the receiver can collect real-time satellite transmitted ephemeris, clock correction, almanac, UTC offset, and ionospheric delay data as well as precise time encoded in the HOW word.

The search for all phase delays of a single spread spectrum signal at one Doppler frequency is discussed. The PN code generator is clocked at a rate at least 32 times its normal rate of 1.023 MHz and the R3 register is clocked at least twice that to produce an R3 register clocking rate of at least 32*1.023 MHz. At this rate, the PN code generator rolls one complete cycle in half the time it takes to collect the next signal segment in R1, $\frac{1}{16}^{th}$ of 1 millisecond, and the replica code segment of the R3 register takes on all possible 2046 states (delays).

In the processing flow diagram of FIG. 10a, while the R1 and R2 registers store the signal and NCO segments as discussed above, the PN generator is clocked 1023 times and the R3 register is clocked 2046 times so that all possible 0.5 chip samples are compared to the R1 times R2 complex product formed at multiplier block 326. Each of the 2046 states of the R3 register produce corresponding SUMI and SUMQ correlator outputs. In FIG. 4, these outputs are delivered to the N-millisecond coherent accumulation RAM 334 via the adder. Each of the 2046 outputs of the SUMI and SUMQ correlator outputs are added to each of the 2046 possible in-phase and quadrature memory words of the N-millisecond coherent accumulation words. Each word in the coherent accumulation RAM represents one each of the 2046 possible 0.5 chip PN phase delays. For each one of the sixteen segments, the R1 and R2 registers store and hold their corresponding data. The R3 register takes on all 2046 code phase states and the output of the correlator during each of these states is added to the successive addresses in the coherent accumulation RAM. When the next segment is collected in the R1 and R2 register, the process repeats. After all 16 segments are processed, the coherent accumulation RAM contains the correlation sum for all possible 0.5 chip PN phase delays for 1 millisecond of processing. The coherent accumulation sum can continue for some programmable integer number of milliseconds.

The correlator may also generate correlation results for more than one satellite. In FIG. 4, multiplexers 328 and 330 select more than one source of Doppler signals and more than one source of PN code signals, respectively. By properly timing the multiplexers, the correlator can compute more than one correlation output for a shortened code phase test range. The design is such that only one time-shared PN code generator and only one Doppler NCO generator are necessary to accomplish the processing over all possible satellite signals, by time multiplexing.

The 3rd entry in the Table of FIG. 3 illustrates, for example, two satellites each searched at 4 different Doppler frequencies and 512 half-chips of code phase uncertainty space. It is assumed that the code phase of the signal is known with sufficient accuracy to place it within 512 half-chips of delay. This is possible under many conditions of autonomous GPS and in assisted operation modes. The controlling processor configures the receiver for a particular mode by writing to control registers. The coherent and non-coherent accumulation RAM is divided into 8 segments, each 512 words long. Each of the 8 segments can be mapped to the 512 half-chips of code phase desired by timing the multiplexer 330 and by programming a pre-correlation shift into the PN code generator 320 driving the R3 register 324. This maps 8 particular code phase search ranges into the 4096 word available accumulation RAM, the available code phase search range being 4096/N, where N is the number of satellites observed. When N=1 or N=2, the maximum code phase search space is 2046 half-chips per Doppler due to the PN code sequence length.

The exemplary embodiment exhibits 0.5 chip sample spacing. The sample spacing may be reduced to 0.25 chip or 0.125 chip spacing by increasing the clock rate of the circuits driving the R1, R2, and R3 registers by factors of 2× or 4×, respectively. Note that this reduces the range of code phase searching by the same factor, for example, if 1023 chips are tested at 0.5 chip spacing, then by doubling the sample rate of the R1, R2 and R3 register driving circuits, the system is capable of testing approximately 511 chips of code phase delay at 0.25 chip spacing to produce a more accurate measurement of code phase because the system will create more closely spaced correlation samples. The sample spacing may be increased also to single chip spacing to extend the number of searchers by causing a 0.5× clock rate on the ISIP output samples, thus extending the number of searchers beyond 4096. For example, the following table defines the four possible states of the receiver data input rate.

| Receiver Data Input Rate | Sample Spacing, in Chips |
| --- | --- |
| 1.023 MHz | 1 Chip |
| 2.046 MHz | ½ Chips |
| 4.096 MHz | ¼ Chips |
| 8.184 MHz | ⅛ Chips |

The total number of RAM cells remain at 4092, but the allocation of the measurement RAM is in steps of 1, ½ ¼, or ⅛ chip spacing. In one embodiment, as many as four satellites can be tested for complete code phase test range simultaneously (at one chip spacing). In another embodiment, as many as 12 satellites can be tested with reduced phase delay as long as the total number of phase delays tested does not exceed 4092 one-eighth chips total.

An alternative method of accomplishing ½ chip or 1 chip spacing is to increment the phase of the PN code stored in the R3 register on each subsequent clock cycle by two half-chips per iteration, whereby only 1023 possible phase delays are created across the entire PN code length, thus allowing for up to four full phase delays to be tested by the 4092 correlators. For this method, the R1 register stores samples at ½ chip spacing, regardless of whether the R3 register is advanced by ½ or 1 chip per clock.

FIG. 10b shows how this is accomplished. As discussed earlier, the input samples from the R1 register and the R2 register are multiplied to produce a product register P. The product register P is then held constant while a predetermined range of code phase delays of the replica PN generator (stored in the R3 register) are applied to a final multiplier, all 128 states of the multiplier outputs are then summed together in summer block 333.

The R3 register contains 128 states of the replica PN code for a particular code phase delay. For each code phase delay, the coherent RAM memory 334 is used as a large number of separate accumulators, one for each of the possible code phase delays tested. In a one-chip mode, the contents of the R3 register are advanced two half-chips of delay per clock cycle, and the coherent RAM 334 is advanced one address so that each memory location in the coherent RAM represents successive one chip delay trials of code phase delay. For example, the results of the correlation of the R3 register for delay zero is written into the delay-zero accumulator address, the results of the correlation of the R3 register for delay one (one-chip different) is written into the delay-one accumulator address and so-forth. Up to 1023 full-chips are tested per satellite representing all possible code phase delays, or a pre-determined number of code phase delays are tested, filling only the corresponding number of Coherent RAM memory locations.

Every one of the 1023 possible states of the R3 register form a unique SUMI and SUMQ output that is summed into the coherent accumulation RAM 334 in successive memory locations. The receiver is programmable so that coherent accumulation is over N milliseconds, each satellite programmable over a different value of N by storing an N value for each satellite searched and applying the N value to the coherent accumulator when the particular satellite is being searched. This alternative mode requires that signal samples be loaded into the R1 register at ½ chip spacing, but the R3 register, whose spacing is ½ chip, is advanced at one chip (two ½ chips) per system clock cycle.

Figure 14:
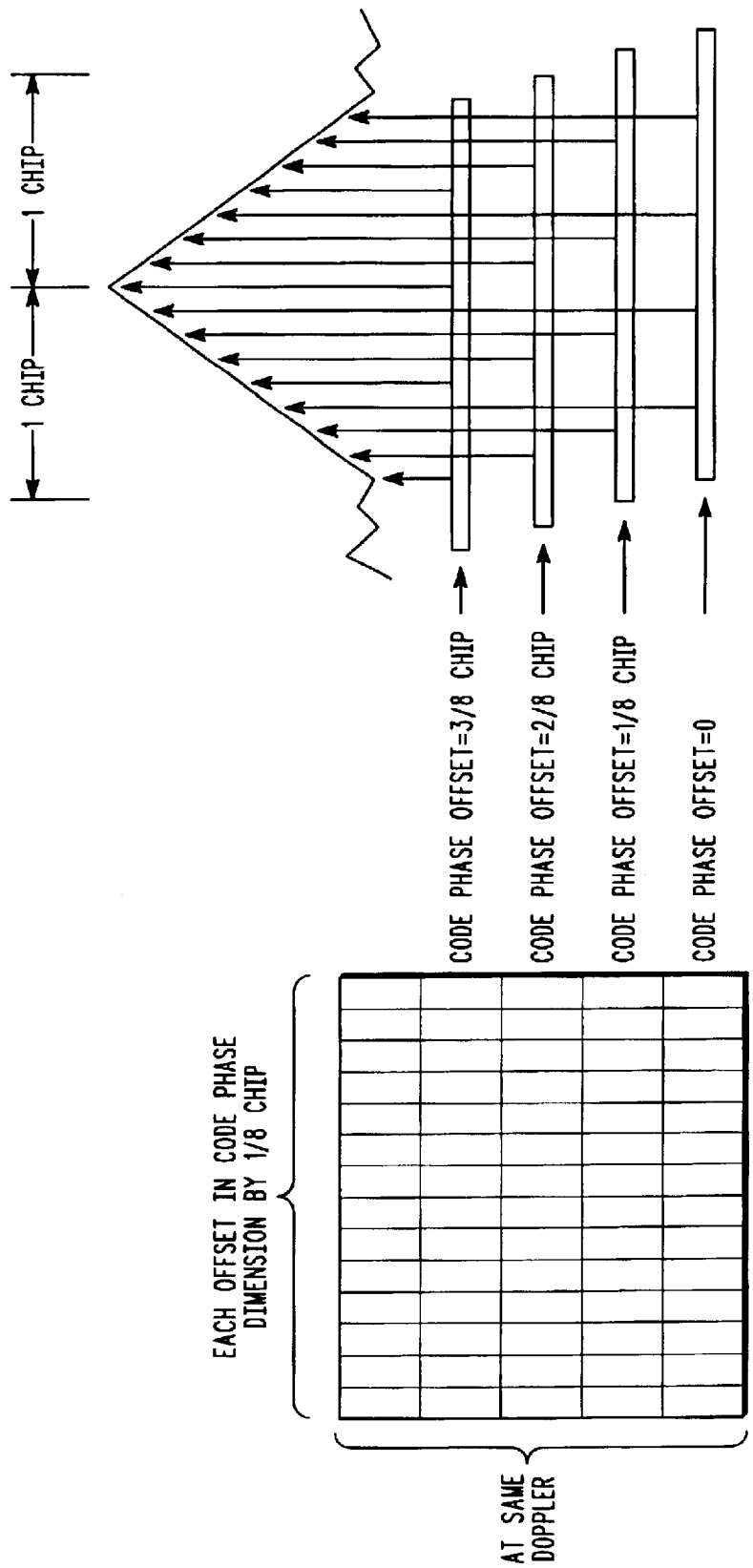
FIG. 14 illustrates offset code phases.

In one embodiment, less than half chip spacing is generated using ½ chip R1 and R2 spacing by assigning multiple correlation trials to the same satellite, each correlation trial shifted in time a small code phase offset (i.e., less than ½ chip spacing) to the segment PN code generator. In FIG. 14, for example, the first code replica signal segment produces outputs at 0, 0.5, 1.0, 1.5 chip spacing. The second code replica signal segment is offset from the first signal segment one by ⅛th chip, producing outputs at 0.125, 0.625, 1.125, 1.625 chip spacing. The third code replica signal segment is offset by $2/8^{th}$ chip, producing outputs at 0.250, 0.750, 1.250, 1.750 chip spacing. The fourth code replica signal segment is offset by ⅜ths chip, producing outputs at 0.375, 0.875, 1.375, 1.875 chip spacing and so forth. In this way, ⅛ chip spacing outputs can be produced. Generally a difference between the first and second time shifts of the replica signal is a fractional multiple of a time interval of the sample rate.

Offsetting by less than ½ chip delay is accomplished by setting the Delta_Cp parameter to a small quantity of less than 770 carrier cycles. For example, to implement ⅛ chip offsets, the Delta_Cp parameter is set to ⅛*1540, or 192.5 carrier cycles. This offsets the corresponding Fractional_Code_Phase[i] term in the Code Phase Computer block for the affected satellite, each test bin offset by a successively increasing amount of 192.5 carrier cycles, so that the bins that are offset further will roll over the 770 carrier cycle limit sooner, thus applying a code phase correction (of a discrete ½ chip stepsize) sooner than the other lesser offsets. That is, the code phase correction steps are still ½ chip physical steps, but the time in which one bin applies a correction is different from a subsequent bin that is proportional to the Delta_Cp parameter, which causes an average offset representing a code phase delay that is much less than ½ chip on each of the affected bins.

In FIG. 4, the coherent sums after N milliseconds can then be passed through a magnitude detector and added to an M millisecond non-coherent accumulation RAM 326. The number M is also programmable. The larger the M interval, the higher the signal processing gain. The N millisecond interval of coherent integration sets the bandwidth of the frequency search as $1/(0.001*N)$ Hz.

In an N millisecond coherent/M millisecond non-coherent integration mode of operation, the number of searchers and code phase and Doppler for each searcher are programmable in the receiver. When the time of arrival (TOA) of data bit edges is known, the receiver may operate in an N millisecond predicted bits coherent integration/M millisecond non-coherent integration mode, where N is typically greater than or equal to 20 milliseconds (GPS bit time) up to and including 200 milliseconds. In a time Offset Search Mode, upon signal detection, the receiver searches for a particular 50 BPS data pattern sequence to arrive, as described for example in copending patent U.S. patent application Ser. No. 09/539,137 entitled "Method and Apparatus For Determining Time in A GPS Receiver", assigned commonly with the present application and incorporated by reference herein.

In a continuous tracking mode, the receiver continuously tracks and demodulates the 50 BPS satellite transmitted data directly from all satellites in view. In a quick search mode, the receiver executes a rapid scan for all visible satellites without having the processor intervene until the entire sequence is complete, wherein one interrupt is generated at the end of the scan. The receiver may also resume the detection process where it left off when power is re-applied.

The receiver also operates in a bit synchronization and demodulation mode wherein data message bit, for example the GPS 50 BPS navigation data message, edges are located for improved signal to noise performance. In this mode, knowledge of the time of arrival of the transmitted data bit edges is not known, but the code phase delay to a satellite of interest has been already been determined.

Figure 15:
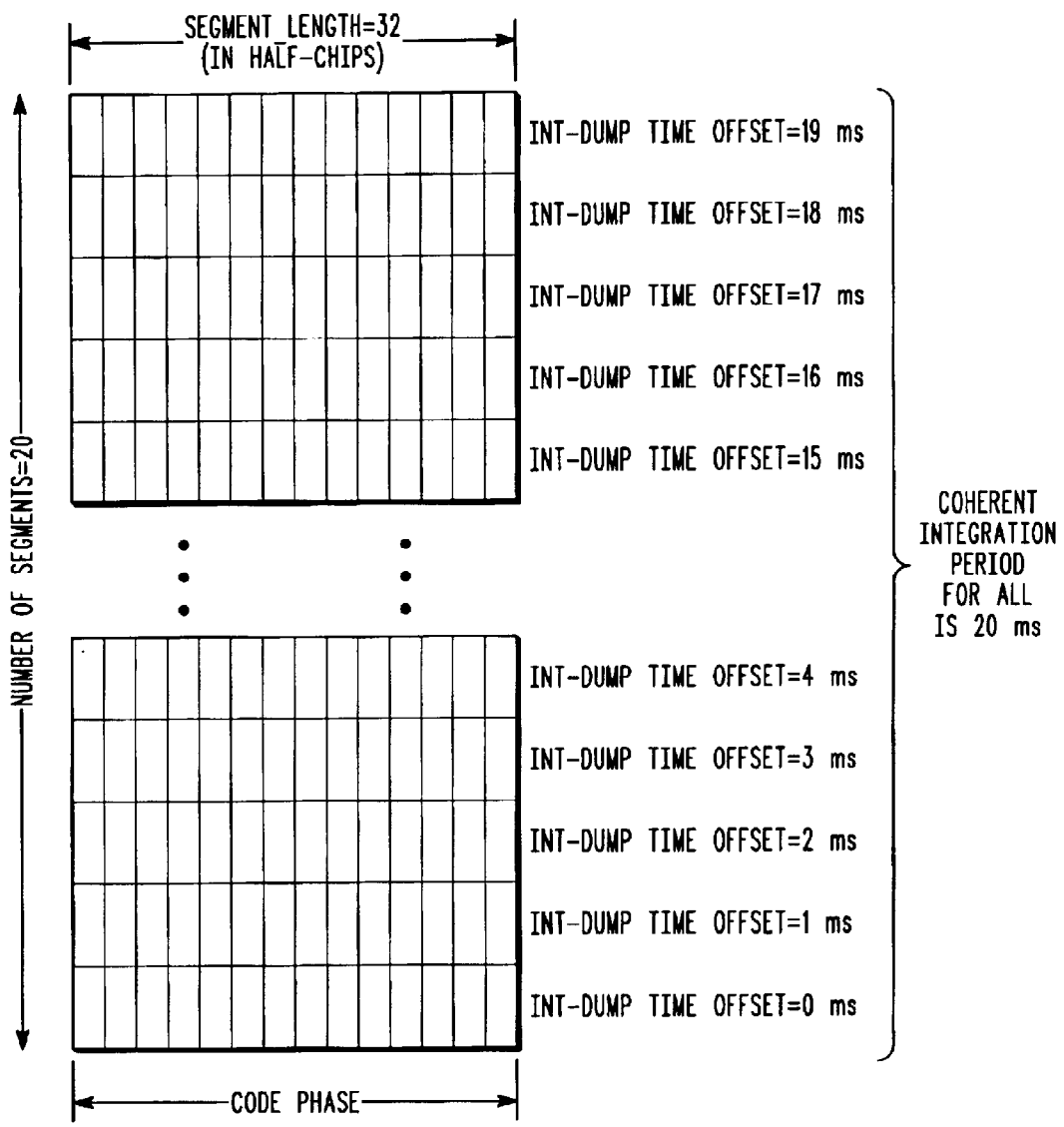
FIG. 15 is a coherent integration diagram.

In FIG. 15, in the exemplary embodiment, 640 (about 15 percent) of the 4096 correlator bins are required to determine the bit synchronization time delay for one or more satellites. The parameter that varies between vertical bins is a time associated with the integration and dump process, all integrate and dump processes are set to a pre-detection integration (PDI) value of 20 milliseconds consistent with the data bit time. The delay of the dump command for each of the 20 integrators changes by one millisecond per vertical bin so as to cover all possible delays of the data bit change. The "Doppler" and "CP_OFFSET" parameters illustrated in FIG. 2 are not varied vertically. Since the PDI parameter is 20 milliseconds, only one of the vertical bins is aligned perfectly with the transmitted 50 BPS data edge. The start of integration for all 20 bins is synchronized to the R1 segment closest to PN code phase 0. That particular bin will integrate non-coherently to a value that is greatest compared to those bins that are misaligned once many data transitions are observed. Also, only one of the vertical bins will be aligned so as to maximally cancel in the coherent sum (when data transitions are present). Another measure of bit-alignment is by locating the bin that integrates to a minimum after many data transitions are summed. When the maximum to minimum non-coherent integrator sum is approximately one-half the data bit time, 10 ms in the exemplary embodiment, bit-synchronization is confirmed. In some applications, for example, those with high noise content, a pass threshold may be established at 9, 10, or 11 milliseconds or some other range that is approximately half the data bit time. Using this method, the receiver can find bit-sync down to signal levels approaching 20 dB-Hz, at least 10 dB better than is possible with traditional bit sync methods.

Alternate methods may be used to confirm bit synchronization. For example, the difference between the maximum sum and the sum which began integration 1 ms earlier can be computed. A second difference can be computed between the maximum sum and the sum which began integration 1 ms later. In one embodiment, if these two differences are within some tolerance of each other, say 10% of the expected correlation difference, bit-synchronization is confirmed. This alternative method does not depend upon a minimum sum, which may be susceptible to noise. Other techniques can use other sums near the maximum sum.

Figure 16:
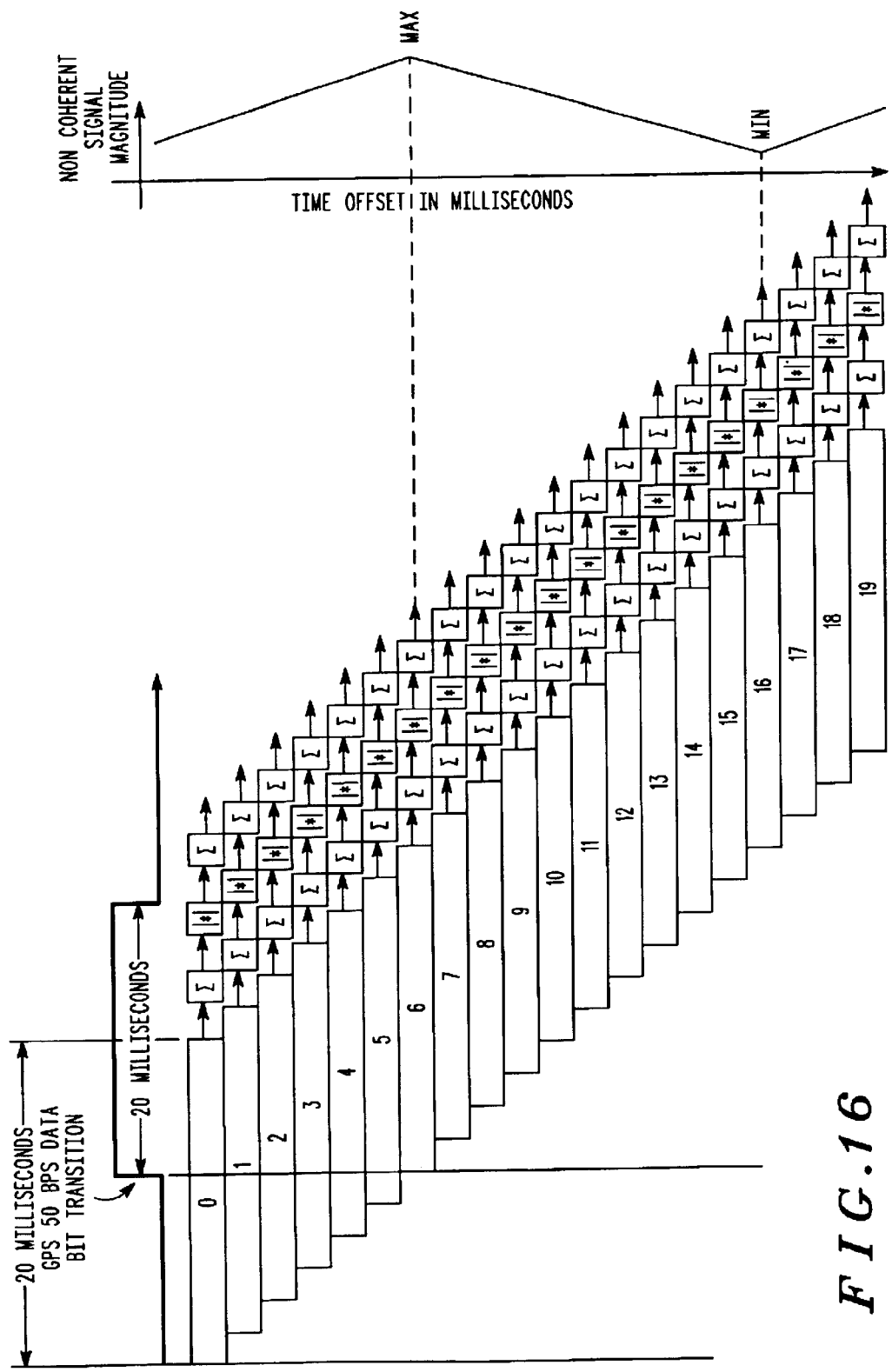
FIG. 16 is a non-coherent signal magnitude versus integration offset time diagram.

In FIG. 16, a plurality of coherent correlations at the determined code phase delay between the first spread spectrum signal and a first replica signal are performed for a time interval corresponding to the data bit time (20 ms in the example). The plurality of coherent correlations, 0–19 in FIG. 16, correspond in number to the integer number (20) of the repeat time of the pseudorandom code bits. Each of the coherent correlations is offset relative to a previous correlation by the repeat time (1 ms in FIG. 16) of the pseudorandom code bits. A magnitude of each of the plurality of coherent correlations is determined, and a plurality of non-coherent sums of magnitudes for each of the plurality of coherent correlations are generated over at least two data bit times (20 ms). The plurality of non-coherent sums of magnitudes correspond in number to the integer number of the repeat time of the pseudorandom code bits. The results of the sequential partial coherent correlations are stored in a corresponding plurality of memory locations corresponding in number to the integer number of the repeat time, and the summed sequential partial correlation results are stored in the plurality of memory locations.

In FIG. 16, the non-coherent signal magnitude is plotted vertically relative to the time offset. The peak energy exists at bin 6 and the minimum energy exists at bin 16 at the corresponding time offsets, the difference of which is approximately 10 ms (one-half the data bit time), which confirms that bit-sync detection has occurred. The offset time of the non-coherent sum having the maximum magnitude corresponds to the bit synchronization offset time of the data bit message. A local time correction may be determined dependent on the arrival time of the data bit edge and the local time of a real-time clock.

Once bit sync time has been determined for one satellite using the technique discussed above (or any other method based on some other correlator architecture, including the prior art correlators cited in the instant application, among others), knowledge of the time of arrival of the data bit edge for one satellite can be used to time synchronize the start of the 20 millisecond integrate and dump process, or coherent integration, in the coherent integrator to integrate over the entire data bit time, avoiding the data transitions during the integration process, and maximizing the signal to noise ratio.

Generally, data bit synchronization of a receiver with a plurality of signals based on a known bit synch offset time for one signal, approximate receiver and signal source locations, and signal source clock correction parameters for each of the plurality of signal may be performed by determining a propagation time between the receiver and sources of each of the plurality of signals, determining a clock error corrected propagation time from the approximate position of the receiver to the source of each of the plurality of signals based on the corresponding propagation time and the corresponding signal source clock correction parameters, and determining an adjusted bit sync offset time for each of the plurality of signals for which bit sync offset time is not known based on the corresponding clock error corrected propagation time for each signal and based in the known bit synch offset time and on the clock error corrected propagation time of the signal for which bit synch offset time is known.

In one embodiment, the signals are satellite based spread spectrum signals and the signal source location is determined by derivation thereof from either ephemeris or almanac data and satellite time.

The clock error corrected propagation time, PTC[I], for each of the signals of interest may be determined by computing PTC[I]=PT[I]+C[I], where PT(I) is the corresponding propagation time and C(I) is a corresponding signal source clock correction based on the signal source clock correction parameters. The propagation time, PT[I], is determined from the approximate position of the receiver to each of the signal sources by dividing the range, R[I], between the receiver and the signal source by the speed of light.

The adjusted bit sync offset time, BSOT[I], to each of the plurality of signal sources for which bit sync offset time is not known is determined by calculating BSOT[I]=BSOT[K]+(PTC[I]−PTC[K]), where BSOT[K] is the known bit synch offset time and PTC[K] is the a clock error corrected propagation time for the signal for which bit synch offset time is known. In one embodiment, each of the plurality of signals is integrated coherently for 20 milliseconds, and a start time of each coherent integration is offset in relation to the corresponding bit synch offset time, BSOT[I].

In the exemplary embodiment satellite based spread spectrum signal embodiment, underflow or overflow is corrected so that BSOT[I] is always in a range of 0 to 20 milliseconds. This can be accomplished with software using a simple algorithm, for example: while(BSOT[I]>20)BSOT[I]=BSOT[I]−20; and while(BSOT[I]<0)BSOT[I]=BSOT[I]+20.

In the exemplary embodiment, these steps will time-align the beginning of the 20 millisecond coherent integration intervals for all satellites based on the bit-sync offset time from one satellite, thus maximizing the signal processing gain for all satellites.

Although the exemplary embodiment and applications are discussed in the context spread spectrum signals transmitted from satellites, those having ordinary skill in the art will understand that many of the methods and architectures of the present invention are applicable for searching and synchronizing spread spectrum signals having other origins, for example those from terrestrial based communications systems.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a satellite positioning system receiver, comprising:

receiving a spread spectrum signal;

performing a plurality of coherent correlations between the spread spectrum signal and a replica signal for a time interval corresponding to a data bit time of message bits modulated on the spread spectrum signal;

the plurality of coherent correlations corresponding in number to an integer number of a repeat time of the pseudorandom code bits;

offsetting each of the coherent correlations relative to a previous correlation by the repeat time of pseudorandom code bits of the spread spectrum signal;

generating a plurality of non-coherent sums of magnitudes for each of the plurality of coherent correlations over an interval of at least two data bit times, the plurality of non-coherent sums of magnitudes corresponding in number to the integer number of the repeat time of the pseudorandom code bits.

2. The method of claim 1, performing the plurality of coherent correlations virtually in parallel by sequentially performing the plurality of coherent correlations at a rate greater than a rate at which pseudorandom code bits of the spread spectrum signal are received.

3. The method of claim 1, confirming bit synchronization by verifying that an integration start time difference between non-coherent sums having minimum and maximum magnitudes is approximately one-half the data bit time, determining a bit synchronization offset time of the message bits as corresponding to an offset time of the non-coherent sum having the maximum magnitude.

4. The method of claim 3, determining an arrival time of a data bit edge of the message bits based on the bit synchronization offset time, determining a local time correction dependent on the arrival time of the data bit edge and a local time of a real-time clock.

5. A method in a satellite positioning system receiver, comprising:

receiving a spread spectrum signal;

performing a plurality of coherent correlations, over a range of code phase uncertainty, between the spread spectrum signal and a replica signal for a time interval corresponding to a data bit time of message bits modulated on the spread spectrum signal, the plurality of coherent correlations corresponding in number to a integer number of a repeat time of a sequence of pseudorandom code bits of the spread spectrum signal;

offsetting each of the plurality of coherent correlations relative to a previous coherent correlation by the repeat time of the pseudorandom code bits;

generating a plurality of non-coherent sums of magnitudes for each of the plurality of coherent correlations over at least two data bit times, the plurality of non-coherent sums of magnitudes corresponding in number to the integer number of the repeat time of the pseudorandom code bits.

6. The method of claim 5, performing the plurality of coherent correlations virtually in parallel by sequentially performing the plurality of coherent correlations at a rate greater than a rate at which pseudorandom code bits of the spread spectrum signal are received.

7. The method of claim 5,
determining a code phase delay of the range of code phase uncertainty for which a non-coherent sum has a maximum magnitude,
confirming bit synchronization by verifying that an integration start time difference between a non-coherent sum having minimum and maximum magnitudes for the determined code phase delay is approximately one-half the data bit time,
determining a bit synchronization offset time of the message bit as corresponding to an offset time of the non-coherent sum having the maximum magnitude for the determined code phase delay.

8. A method in a satellite positioning system receiver, comprising:
receiving a spread spectrum signal;
performing a plurality of sequential partial coherent correlations on each of a plurality of sequential signal segments of the spread spectrum signal with a corresponding sequential segment of a replica signal, the plurality of sequential partial coherent correlations corresponding in number to an integer number of a repeat time of pseudorandom code bits of the spread spectrum signal;
summing sequential results of the plurality of sequential partial coherent correlations performed on the plurality of sequential signal segments for a time corresponding to a data bit time of message bits modulated on the spread spectrum signal;
offsetting each of the plurality of summed sequential results relative to another by a distinct multiple of the repeat time of the pseudorandom code bits;
generating a plurality of non-coherent sums of magnitudes for each of the plurality of coherent correlations over at least two data bit times,
the plurality of non-coherent sums of magnitudes corresponding in number to the integer number of the repeat time of the pseudorandom code bits.

9. The method of claim 8, performing the plurality of sequential partial coherent correlations virtually in parallel by sequentially performing the plurality of sequential partial coherent correlations at a rate greater than a rate at which pseudorandom code bits of the spread spectrum signal are received.

10. The method of claim 8,
determining a code phase delay of the range of code phase uncertainty for which a non-coherent sum has a maximum magnitude,
verifying that a difference between a non-coherent sum having minimum and maximum magnitudes for the determined code phase delay is approximately one-half the data bit time,
determining a bit synchronization offset time of the data bit message as corresponding to an offset time of the non-coherent sum having the maximum magnitude for the determined code phase delay.

11. The method of claim 8,
storing results of the sequential partial coherent correlations in a corresponding plurality of memory locations corresponding in number to the integer number of the repeat time;
storing the summed sequential partial correlation results in the plurality of memory locations.

12. A method in a satellite positioning system (SPS) receiver, comprising:
determining a propagation time between the SPS receiver and sources of each of a plurality of signals;
determining a clock error corrected propagation time from an approximate position of the SPS receiver to the source of each of the plurality of signals based on the corresponding propagation times and known corresponding signal source clock correction parameters;
determining an adjusted bit sync offset time for each of the plurality of signals for which bit sync offset time is not known based on the corresponding clock error corrected propagation time for each signal, based on a known bit synch offset time, and based on clock error corrected propagation time of the signal for which bit synch offset time is known.

13. The method of claim 12, the signals are satellite based spread spectrum signals, determining signal source location by derivation thereof from ephemeris data and satellite time.

14. The method of claim 12, the signals are satellite based spread spectrum signals, determining signal source location by derivation thereof from almanac data and satellite time.

15. The method of clam 12, determining the clock error corrected propagation time, PTC[I], for each signal by computing PTC[I]=PT[I]+C[I], where PT(I) is the corresponding propagation time and C(I) is a corresponding signal source clock correction based on the signal source clock correction parameters.

16. The method of claim 15, determine a range, R[I], between the approximate position of the receiver and each of plurality of signal sources, determining the propagation time, PT[I], from the approximate position of the receiver to each of the signal sources by dividing the corresponding range, R[I] by the speed of light.

17. The method of claim 15, determining the adjusted bit sync offset time, BSOT[I], to each of the plurality of signal sources for which bit sync offset time is not known by calculating BSOT[I]=BSOT[K]+(PTC[I]−PTC[K]), where BSOT[K] is the known bit synch offset time and PTC[K] is the a clock error corrected propagation time for the signal for which bit synch offset time is known.

18. The method of claim 17, coherently integrating each of the plurality of signals for 20 milliseconds, offsetting a start time of each coherent integration in relation to the corresponding bit synch offset time, BSOT[I].

* * * * *